(12) United States Patent
Jung et al.

(10) Patent No.: US 8,374,591 B2
(45) Date of Patent: Feb. 12, 2013

(54) METHOD AND SYSTEM FOR PROVIDING NOTIFICATION MESSAGE IN A MOBILE BROADCAST SYSTEM

(75) Inventors: Bo-Sun Jung, Seongnam-si (KR);
Sung-Oh Hwang, Yongin-si (KR);
Jong-Hyo Lee, Pyeongtaek-si (KR);
Kook-Heui Lee, Yongin-si (KR);
Jae-Yeon Song, Seoul (KR)

(73) Assignee: Samsung Electronics Co., Ltd (KR)

(*) Notice: Subject to any disclaimer, the term of this patent is extended or adjusted under 35 U.S.C. 154(b) by 595 days.

(21) Appl. No.: 11/714,086

(22) Filed: Mar. 5, 2007

(65) Prior Publication Data

US 2007/0220558 A1    Sep. 20, 2007

(30) Foreign Application Priority Data

| Mar. 3, 2006 | (KR) | .................. | 10-2006-0020680 |
| Jun. 15, 2006 | (KR) | .................. | 10-2006-0054106 |
| Aug. 16, 2006 | (KR) | .................. | 10-2006-0077364 |
| Aug. 25, 2006 | (KR) | .................. | 10-2006-0080851 |

(51) Int. Cl.
*H04L 29/06* (2006.01)

(52) U.S. Cl. ............... 455/414.3; 455/414.1; 455/414.2; 455/450

(58) Field of Classification Search .................. 455/433, 455/414.1–414.3, 418–420, 422.1, 426.1, 455/450–455, 464, 509; 709/228, 230; 370/465, 370/312, 349, 464, 475, 480, 477, 478, 485, 370/486, 490, 493, 546, 328–330, 341, 348, 370/431–463; 725/37–62, 86–106, 109–142
See application file for complete search history.

(56) References Cited

U.S. PATENT DOCUMENTS

| 5,612,959 | A * | 3/1997 | Takase et al. ................. 370/390 |
| 6,505,347 | B1 | 1/2003 | Kaneko et al. |
| 6,965,580 | B1 | 11/2005 | Takagi et al. |
| 7,289,795 | B2 * | 10/2007 | Ma et al. ..................... 455/414.1 |
| 7,324,542 | B2 * | 1/2008 | Cookson et al. ............. 370/432 |
| 7,461,067 | B2 * | 12/2008 | Dewing et al. ........................ 1/1 |

(Continued)

FOREIGN PATENT DOCUMENTS

| EP | 1 353 523 | 10/2003 |
| EP | 1 770 884 | 4/2007 |

(Continued)

OTHER PUBLICATIONS

OMA Open Mobile Alliance, "BCRO and Various Addressing Modes", May 13, 2005.

(Continued)

*Primary Examiner* — Patrick Edouard
*Assistant Examiner* — Ronald Eisner
(74) *Attorney, Agent, or Firm* — The Farell Law Group, P.C.

(57) ABSTRACT

A method for providing a notification message in a transmitter of a mobile broadcast system supporting an interaction channel is disclosed. Upon an occurrence of a notification event, a first means generates a notification message, and generates at least one delivery request message including a target address based on subscription information of the corresponding terminal, using the generated notification message. A second means determines a channel over which it will deliver a notification message to the corresponding terminal based on the target address, and delivers the notification message over the determined channel.

17 Claims, 19 Drawing Sheets

U.S. PATENT DOCUMENTS

| | | | |
|---|---|---|---|
| 7,647,058 B2* | 1/2010 | Kim et al. | 455/466 |
| 2003/0187996 A1* | 10/2003 | Cardina et al. | 709/228 |
| 2004/0205212 A1* | 10/2004 | Huotari et al. | 709/230 |
| 2005/0090235 A1* | 4/2005 | Vermola et al. | 455/414.3 |
| 2005/0180356 A1* | 8/2005 | Gillies et al. | 370/329 |
| 2005/0195774 A1* | 9/2005 | Chennikara et al. | 370/338 |
| 2006/0126590 A1* | 6/2006 | Putcha et al. | 370/343 |
| 2006/0189300 A1* | 8/2006 | Hwang et al. | 455/412.2 |
| 2006/0221882 A1* | 10/2006 | Jung et al. | 370/312 |
| 2006/0248211 A1* | 11/2006 | Hwang et al. | 709/231 |
| 2007/0036102 A1* | 2/2007 | Hwang et al. | 370/328 |
| 2007/0041377 A1* | 2/2007 | Song et al. | 370/389 |
| 2007/0053291 A1* | 3/2007 | Hiltunen et al. | 370/233 |
| 2007/0124359 A1* | 5/2007 | Hwang et al. | 709/200 |
| 2007/0234396 A1* | 10/2007 | Lee et al. | 725/136 |
| 2009/0069003 A1* | 3/2009 | Kim et al. | 455/422.1 |
| 2009/0185522 A1* | 7/2009 | Periyalwar et al. | 370/328 |

FOREIGN PATENT DOCUMENTS

| | | |
|---|---|---|
| JP | 2001-053675 | 2/2001 |
| JP | 2003-060594 | 2/2003 |
| JP | 2008-529343 | 7/2008 |
| KR | 1020020048501 | 6/2002 |
| KR | 1020030008878 | 1/2003 |
| KR | 1020060085893 | 7/2006 |
| RU | 2 275 742 | 4/2006 |
| WO | WO 03/045064 | 5/2003 |
| WO | WO 2006/080804 | 8/2006 |

OTHER PUBLICATIONS

OMA Open Mobile Alliance: "Broadcast Distribution System Adaptation—IPDC over DVB-H, Draft Version 1.0", Feb. 15, 2006.

OMA Open Mobile Alliance: "Mobile Broadcast Services Architecture Draft Version 1.0", Apr. 20, 2005.

3GPP TS 23.246 v6.9.0, 3rd Generation Partnership Project; Technical Specification Group Services and System Aspects; Multimedia Broadcast/Multicast Service (MBMS); Architecture and Functional Description, (Release 6), Dec. 2005.

* cited by examiner

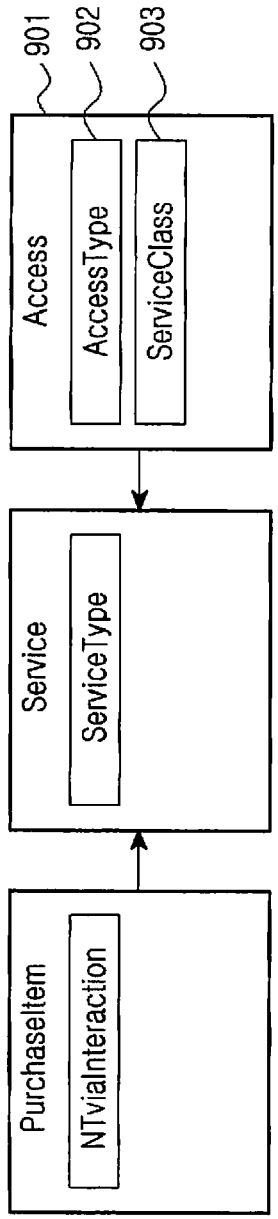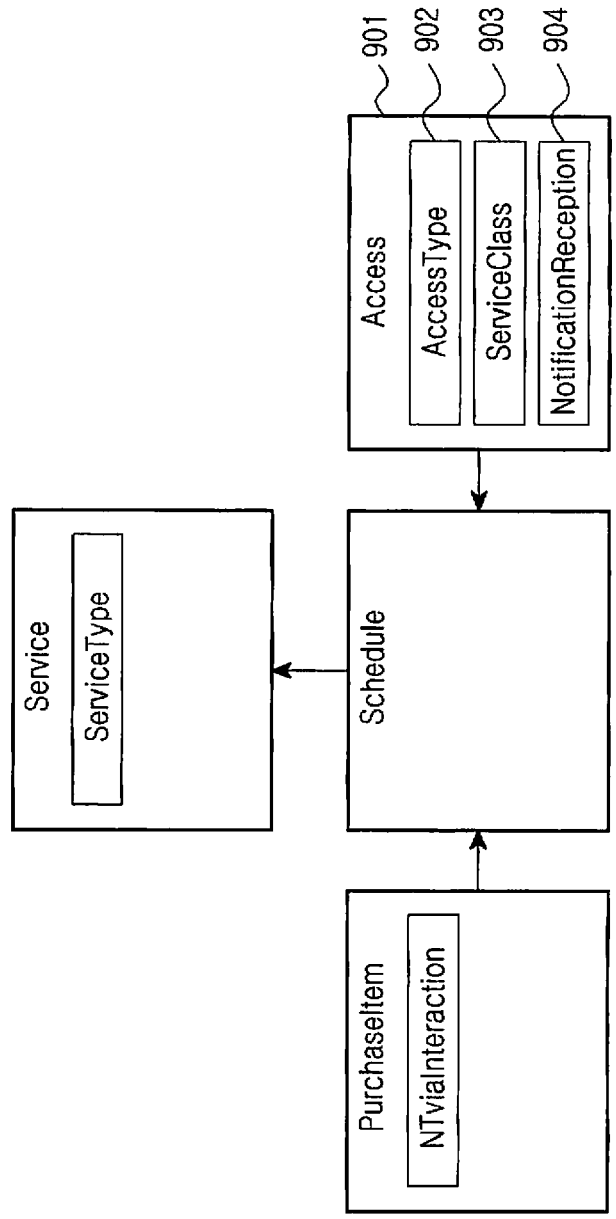
FIG.5C
FIG.5D

```
<complexType name="AcquisitionType">
   <sequence>
      <element name="ComponentDescription" type="esg:ComponentDescriptionType" maxOccurs="unbounded"/>
      <element name="ZappingSupport" type="esg:ZappingSupportType" minOccurs="0"/>
      <element name="KeyStream" type="esg:KeyStreamBaseType" minOccurs="0" maxOccurs="unbounded"/>
   </sequence>
   <attribute name="contentMimeType" type="mpeg7:mimeType" use="required"/>
   <attribute name="acquisitionID" type="anyURI" use="required"/>
</complexType>

<complexType name="ComponentDescriptionType">
   <sequence>
      <element name="ComponentCharacteristic" type="esg:ComponentCharacteristicType" minOccurs="0"
          maxOccurs="unbounded"/>
      <element name="SessionDescription" type="esg:SessionDescriptionBaseType"/>
      <element name="NotificationReception" type="esg:NotificationReceptionType"/>
   </sequence>
</complexType>

<complexType name="NotificationReceptionType">
   <sequence>
      <element name="NotificationAddress" type="string" minOccurs="0" />
      <element name="NotificationPort" type="integer"/>
   </sequence>
</complexType>
```

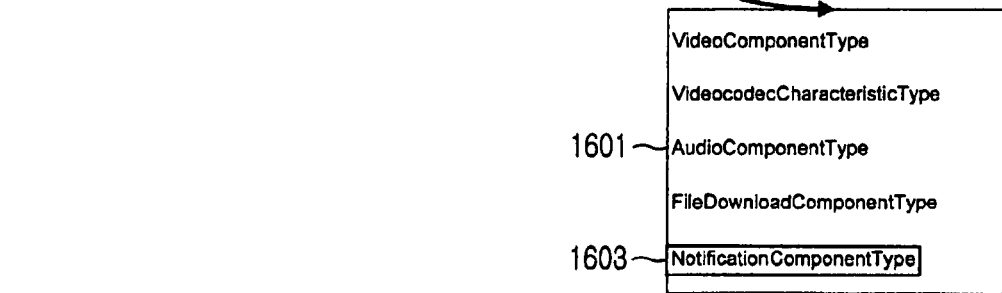

1601 — VideoComponentType / VideocodecCharacteristicType / AudioComponentType / FileDownloadComponentType 1603 — NotificationComponentType

FIG.16

METHOD AND SYSTEM FOR PROVIDING NOTIFICATION MESSAGE IN A MOBILE BROADCAST SYSTEM

PRIORITY

This application claims the benefit under 35 U.S.C. §119 (a) of Korean Patent Applications filed in the Korean Intellectual Property Office on Mar. 3, 2006 and assigned Serial No. 20680-2006, filed on Jun. 15, 2006 and assigned Serial No. 54106-2006, filed on Aug. 16, 2006 and assigned Serial No. 77364-2006 and filed on Aug. 25, 2006 and assigned Serial No. 80851-2006, the contents of each of which are hereby incorporated by reference.

BACKGROUND OF THE INVENTION

1. Field of the Invention

The present invention relates generally to a method and system for providing a notification message in a mobile broadcast system, and in particular, to a method and system for providing a notification message using an interaction channel in a mobile broadcast system.

2. Description of the Related Art

The mobile communication market constantly faces the need for the continued production of new services through a recombination or an integration of the existing technologies. Today, due to the development of communication and broadcast technologies, the conventional broadcast system or mobile communication system has reached the phase of providing broadcast services through portable terminals (or mobile terminals or terminals) such as a mobile phone, a Personal Digital Assistant (PDA), and the like. The convergence of mobile communication services and Internet Protocol (IP) technology is now the mainstream of the next generation mobile communication technology, in order to conform with the latent market needs, the increasing user demand for multimedia services, the strategy of the service providers for providing new services like the broadcast service in addition to the existing voice service, and the interests of the Information Technology (IT) companies that are reinforcing their mobile communication business to meet the user demands.

Open Mobile Alliance (OMA), which is a group assembled to study the standard for the inter-working between individual mobile solutions, has taken charge of establishing various application standards for mobile game, Internet service, and the like. In particular, OMA Browser and Content (BAC) Mobile Broadcast (BCAST) Sub Working Group, one of the OMA working groups, is studying the technology that provides broadcast services using mobile terminals. A brief description will now be made of a mobile broadcast system being discussed in OMA BCAST Working Group.

The mobile broadcast system includes a process of discovering a service by a terminal capable of receiving mobile broadcast, a process of subscribing to a service by the terminal, a process of providing various control information for receiving the service, a process of delivering the service, and a process of receiving the service by the terminal. In the mobile broadcast system, during a mobile broadcast process, the terminal receives a notification message including various control information for a broadcast service when the terminal receives the broadcast service.

In the mobile broadcast system, while the terminal receives a broadcast, changes may occur in the broadcast system due to various factors. Some of the changes can be the information that should necessarily be provided to the terminal. The information can include, for example, a change in a mobile broadcast service time, a change in information for the reception of the mobile broadcast service, and the like.

A method for delivering a notification message in the mobile broadcast system has already been defined.

SUMMARY OF THE INVENTION

However, in a mobile broadcast system supporting an interaction channel, a delivery method for a notification message has not been defined yet. Thus, there is a need for a definition of the notification message delivery method.

An aspect of the present invention is to address at least the problems and/or disadvantages and to provide at least the advantages described below. Accordingly, an aspect of the present invention is to provide a method and system for delivering a notification message in a mobile broadcast system.

Another aspect of the present invention is to provide a method and system for delivering a notification message in a mobile broadcast system supporting an interaction channel.

According to one aspect of the present invention, there is provided a method for providing a notification message in a transmitter of a mobile broadcast system supporting an interaction channel, the method includes upon an occurrence of a notification event, generating, by a first means that manages subscription information of a terminal, a notification message, and generating at least one delivery request message including a target address based on subscription information of a terminal, using the generated notification message; and determining, by a second means that delivers a notification message, a channel over which the second means will deliver a notification message to the terminal based on the target address, and delivering the notification message over the determined channel.

According to another aspect of the present invention, there is provided a transmitter in a mobile broadcast system supporting an interaction channel, the transmitter includes a first means for managing subscription information of a terminal, and upon an occurrence of a notification event, generating a notification message and generating at least one delivery request message including a target address based on subscription information of a terminal, using the generated notification message; and a second means for determining a channel over which the second means will deliver a notification message to the terminal based on the target address, and delivering the notification message over the determined channel.

According to a further aspect of the present invention, there is provided a method for receiving a notification message in a terminal of a mobile broadcast system supporting an interaction channel, the method includes checking notification content from a service guide, and for service subscription/purchase, delivering a subscription request message for a notification message to a first means that manages subscription information of the terminal, the request message including reception channel information for the notification message; receiving a response message including authentication information from the first means; and after completion of the authentication, receiving a notification message delivered according to the delivery channel information.

According to a still further aspect of the present invention, there is provided a terminal in a mobile broadcast system supporting an interaction channel, the terminal includes a first means for checking notification content from a service guide, and for service subscription/purchase, delivering a subscription request message for a notification message to an entity that manages subscriber information of the terminal, and receiving authentication information in response thereto, the request message including reception channel information for the notification message; and a second means for, after completion of the authentication, receiving a notification message delivered according to the delivery channel information.

According to a still further aspect of the present invention, there is provided a method for providing a notification message in a mobile broadcast system supporting an interaction channel, the method includes checking, by a terminal, notification content from a service guide, and for service subscription/purchase, delivering a subscription request message for a notification message to a transmitter that manages subscription information of the terminal, the request message including reception channel information of the notification message; and performing, by the transmitter, authentication according to the subscription request message, storing subscription information of the terminal, and upon an occurrence of a notification event, delivering a notification message of the corresponding service based on the channel information.

According to a still further aspect of the present invention, there is provided a mobile broadcast system supporting an interaction channel, the system includes a terminal for checking notification content from a service guide, and for service subscription/purchase, delivering a subscription request message for a notification message to a transmitter that manages subscription information of the terminal, the request message including reception channel information of the notification message; and the transmitter for storing subscription information of the terminal according to the subscription request message, and upon an occurrence of a notification event, delivering a notification message of the corresponding service to the terminal based on the channel information.

BRIEF DESCRIPTION OF THE DRAWINGS

The above and other objects, features and advantages of the present invention will become more apparent from the following detailed description when taken in conjunction with the accompanying drawings in which:

FIGS. 5A to 5D illustrate detailed embodiments of a service guide including a Notification value in a mobile broadcast system according to the first embodiment of the present invention;

FIG. 16 illustrates a CBMS-based ESG data module in a mobile broadcast system according to the second embodiment of the present invention.

DETAILED DESCRIPTION OF EXEMPLARY EMBODIMENTS

Figure 1:
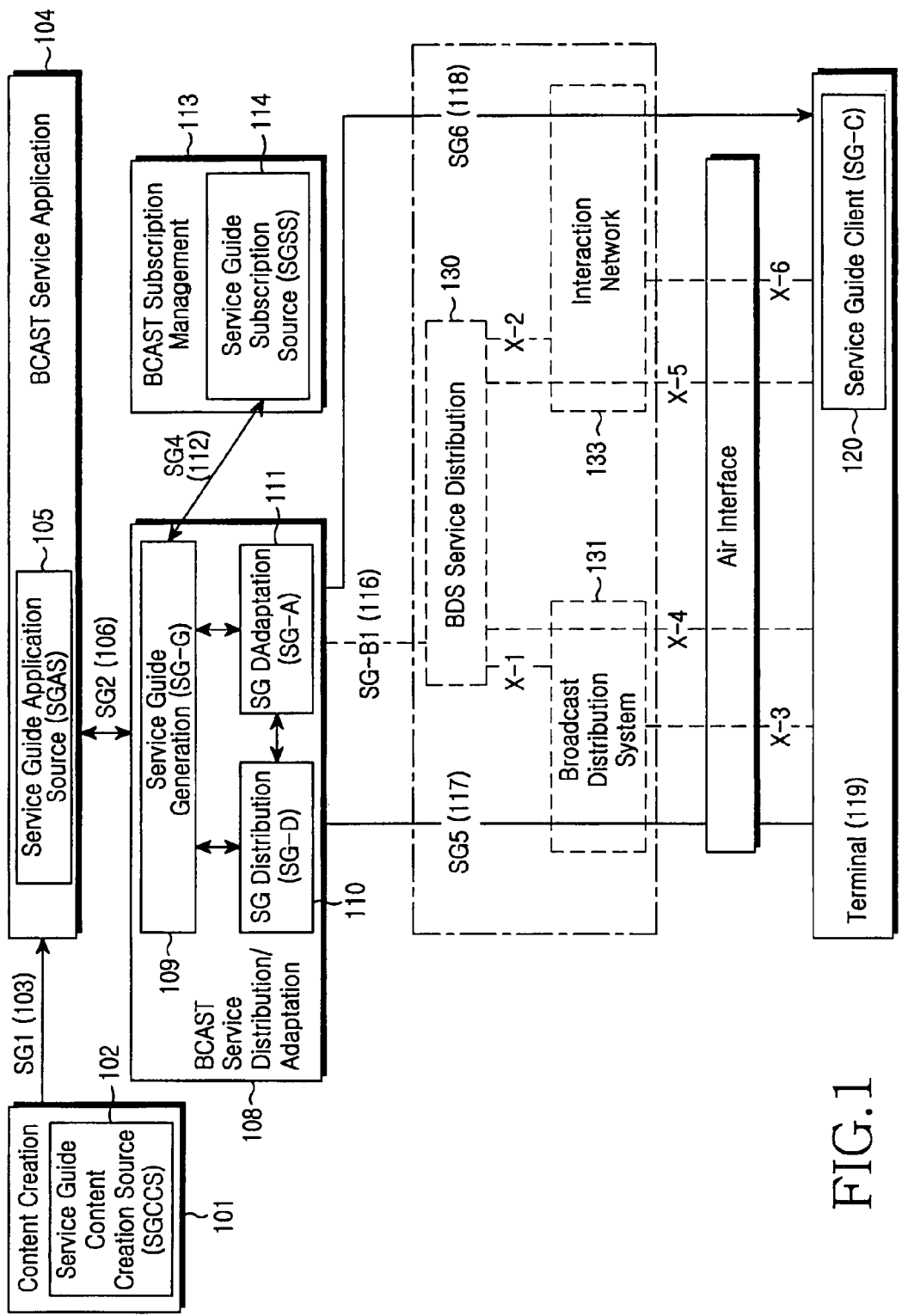
FIG. 1 illustrates a system for delivering a service guide to a mobile terminal in a mobile broadcast system according to a first embodiment of the present invention.

Exemplary embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention provides a method and system for managing a notification message in a mobile broadcast system supporting an interaction channel. Several embodiments of the mobile broadcast system according to the present invention will be described herein. A notification message delivery method according to the present invention will also be described. In a first embodiment, a broadcast system defined in $3^{rd}$ Generation Partnership Project (3GPP), which is the asynchronous mobile communication standard, or defined in Open Mobile Alliance (OMA), which is the standard group for terminal application, will be described, and in a second embodiments a Digital Video Broadcasting-Convergence of Broadcasting and Mobile Service (DVB-CBMS) system, which is another mobile broadcast standard group, will be described. The first embodiment of the present invention will be described with reference to the architecture and terms used in OMA, and the architecture and terms used in the second embodiment will be mapped to the architecture and terms of the mobile broadcast system according to the first embodiment.

For a better understanding of the notification message, a mobile broadcast system according to the first embodiment will now be described. Although the entities and names defined in BCAST of OMA will be used in the first embodiment, the stated standard and entity names thereof are not intended to limit the scope of the present invention, and the present invention can be applied to any system having a similar technical background.

In the mobile broadcast system, a mobile terminal that receives a broadcast service should receive Service Guide (SG) information including description information of the service itself, charging information for the service, and information on a reception method of the service. The mobile terminal receives a corresponding service using the service guide information.

Although a description of the present invention will be made herein with reference to the OMA BCAST technology, which is one of the mobile broadcast technology standards, by way of example, the description is not intended to limit the present invention.

FIG. 1 illustrates constituent elements for delivering a service guide to a mobile terminal in a mobile broadcast system according to a first embodiment of the present invention. Before a description of FIG. 1 is given, a definition of interfaces used between the constituent elements is given in Table 1.

TABLE 1

| Interfaces | Definition |
|---|---|
| SG1 | Server-to-server communications for delivering content attributes such as description information., location information, target terminal capabilities, target user profile, etc., either in the form of BCAST service guide fragments; or in a proprietary format. |
| SG2 | Server-to-server communications for delivering BCAST service attributes such as service/content description information, scheduling information, location information, target terminal capabilities, target user profile, etc., in the form of BCAST service guide fragments. |
| SG-B1 | Server-to-server communications for either BDS specific attributes from BDS to BCAST Service Guide Adaptation function, to assist Service Guide adaptation to specific BDS, or to deliver BCAST Service Guide attributes to BDS specific adaptation and distribution. |
| SG4 | Server-to-server communications for delivering provisioning information, purchase information, subscription information, promotional information, etc., in the form of BCAST service guide fragments. |
| SG5 | Delivery of BCAST Service Guide through Broadcast Channel, over IP. |
| SG6 | Delivery of BCAST Service Guide through Interaction Channel, interactive access to retrieve Service Guide or additional information related to Service Guide, for example, by HTTP, SMS, or MMS. |

Referring to FIG. 1, a Content Creation (CC) 101 is a provider of a broadcast service (BCAST service), and the BCAST service can include the conventional audio/video broadcast service, music/data file download service, and the like. With use of a Service Guide Content Creation Source (SGCCS) 102, the CC 101 delivers content information necessary for the generation of a service guide for a BCAST service, capability information of a mobile terminal, user profile, content time information, and the like, to a Service Guide Application Source (SGAS) 105 of a BCAST Service Application (BSA) 104 via an SG1 interface 103 of Table 1.

The BSA 104 controls the processing BCAST service data provided from the CC 101 into a format suitable for a BCAST network. In addition, the BSA 104 controls the generation of standardized metadata required for the mobile broadcast guide. The SGAS 105 delivers various sources necessary for the generation of a service guide, such as service/content specific information, scheduling information, location information, etc., including the information provided from the SGCCS 102 to a Service Guide Generation (SG-G) 109 in a BCAST Service Distribution/Adaptation (BSD/A) 108 via an SG2 interface 106.

The BSD/A 108 controls establishing a bearer over which it will deliver the BCAST service data provided from the BSA 104, determining delivery schedule for the BCAST service, and generating mobile broadcast guide information. The BSD/A 108 is connected to a Broadcast Distribution System (BDS) 131 for delivering BCAST service data through a broadcast channel, and an Interaction Network (IN) 133 for supporting interaction communication through an interaction channel.

The service guide generated from the SG-G 109 is delivered to a mobile terminal (Terminal) 119 via an SG Distribution (SG-D) 110 and an SG5 interface 117.

A BCAST Subscription Management (BSM) 113 manages subscription information and service provisioning information for the receipt of a BCAST service, and device information for a mobile terminal receiving the BCAST service. A Service Guide Subscription Source (SGSS) 114 in the BSM 113 delivers subscription/provisioning sources related to the generation of a service guide, and sources such as purchase information and promotional information, to the SG-G 109 in order to generate a service guide, via an SG4 interface 112.

The Terminal 119 is a terminal capable of receiving a BCAST service, and has a function capable of connecting with a cellular network according to terminal capability. The Terminal 119, having a Service Guide Client (SG-C) 120, receives a service guide delivered via an SG5 interface 117, or receives a notification message delivered via an SG6 interface 118, and performs an operation appropriate for the BCAST service reception.

Table 2 to Table 4 set forth definitions of functions for the major constituent elements of FIG. 1, specified in the OMA BCAST standard.

TABLE 2

| Logical Entities | Definition |
|---|---|
| Content Creation | In Content Creation, Service Guide Content Creation Source (SGCCS) may provide contents attributes such as content description information, target terminal capabilities, target user profile, content timing information, etc., and sends them over SG1 in the form of standardized BCAST Service Guide fragments, or in a proprietary format |
| BCAST Service Application | In BCAST service Application, Service Guide Application Source (SGAS) provides service/content description information, scheduling information, location information, target terminal capabilities, target user profile, etc., and sends them over SG2 in the form of standardized BCAST Service Guide fragments. |
| BCAST Subscription Management | In BCAST Subscription Management, Service Guide Subscription Source (SGSS) provides provisioning information, purchase information, subscription information, subscription information, promotional information, etc., and sends them over SG4 in the form of Service Guide fragments. |

TABLE 3

| Logical Entities | Definition |
|---|---|
| Service Guide Generation (SG-G) | The Service Guide generation (SG-G) in the network is responsible for receiving Service Guide fragments from various sources such as SGCCS, SGAS, SGSS over SG-2 and SG-4 interfaces, SG-G assembles the fragments such as services and content access information, according to a standardized schema, and generates Service Guide which is sent to Service Guide Distribution (SG-D) for transmission. Before transmission, it is optionally adapted in the Service |

TABLE 3-continued

| Logical Entities | Definition |
| --- | --- |
| | Guide Adaptation Function (SG-A) to suit a specific BDS. |
| Service Guide Client Function (SG-G) | The Service Guide Client Function (SG-C) in the terminal is responsible for receiving the Service Guide information from the underlying BDS, and making the Service Guide available to the mobile terminal. The SG-C obtains specific Service Guide information, it may filter it to match the terminal specified criteria (for example, location, user profile, terminal capabilities), or it simply obtains all available Service Guide information, Commonly, the user may view the Service Guide information, in a menu, list or tabular format. SG-C may send a request to the network through SG-t to obtain specific Service Guide information, or the whole Service Guide. |

TABLE 4

| Logical Entities | Definition |
| --- | --- |
| SG Distribution (SG-D) | SG-D generates an IP flow to transmit Service Guide over the SG5 interface and the broadcast channel to the SG-C. Before transmission, the SG-G may send Service Guide to Service Guide Adaptation (SG-A) to adapt the Service Guide to suit specific BDS, according to the BDS attributes sent by BDS Service Distribution over SG-B1. The adaptation might result in modification of Service Guide. Note that, for adaptation purpose, the SG-A may also send the BCAST Service Guide attributes or BCAST Service Guide fragments over SG-B1 to BDS Service Distribution for adaptation, this adaptation within BDS Service Distribution is out of the scope of BCAST, SG-D may also receive a request for Service Guide information, and send the requested Service Guide information to the terminal directly through the interaction channel. SG-D also may filter Service Guide information from SG-G based on End Users pre-specified profile. SG-D may also send the Service Guide to the BDS, which modifies the Service Guide (e.g., by adding BDS specific information), and further distributes the Service Guide to the SG-C in a BDS specific manner. |

Figure 2:
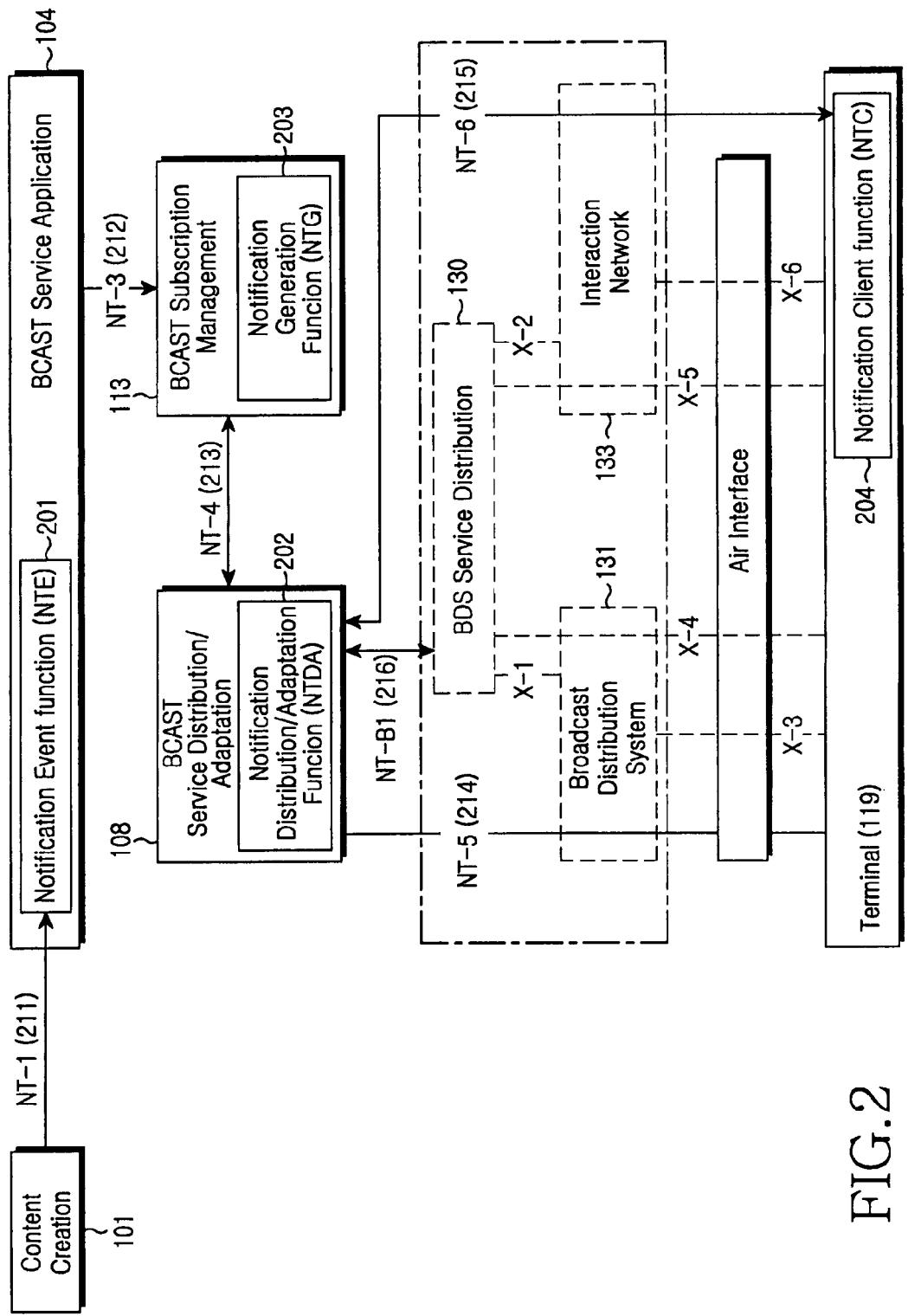
FIG. 2 illustrates notification architecture in a mobile broadcast system according to the first embodiment of the present invention.

FIG. 2 illustrates notification architecture in a mobile broadcast system according to the first embodiment of the present invention.

A CC 101 is a provider of a broadcast service (BCAST service). The BCAST service can include the conventional audio/video broadcast service, music/data file download service, and the like. If there is any problem or change in the provisioning of the BCAST service, the CC 101 notifies the change to a Notification Event Function (NTE) 201 in a BSA 104.

The BSA 104 controls the processing of the BCAST service data provided from the CC 101 into a format suitable for a BCAST network, and the generating of the standardized metadata necessary for mobile broadcast guide. In addition, the BSA 104 notifies a change in the BCAST service, provided from the CC 101, to a Notification Generation Function (NTG) 203 in a BSM 113.

A BSD/A 108 controls the establishing of a bearer channel over which the BDS/A 108 will deliver the BCAST service data provided from the BSA 104, the determining of the delivery schedule for the BCAST service, and the generating of the mobile broadcast guide information, and is connected to a BDS 131 and an IN 133. In addition, the BSD/A 108, having a Notification Distribution/Adaptation Function (NTDA) 202, receives a notification message from the BSM 113 and delivers the notification message to an individual user or a plurality of users via the BDS 131 or the IN 133.

The BSM 113 manages subscription information and service provisioning information for receipt of a BCAST service, and device information for a mobile terminal receiving the BCAST service. In particular, the BSM 113, having the NTG 203, receives information on a notification event occurring in various network entities for providing a mobile broadcast service and generates a notification message using the received information, or generates a notification message for a self event of the BCAST service.

The Terminal 119 is a terminal capable of receiving the BCAST service, and has a function capable of connecting with a cellular network according to terminal capability. With use of a Notification Client Function (NTC) 204, the Terminal 119 receives a notification message delivered via an NT5 interface 214 and performs an appropriate operation according to the NT5 notification message, or receives a notification message delivered via an NT6 interface 215 and performs an appropriate operation according to the NT6 notification message.

An NT-1 interface 211, an interface between the NTE 201 in the BSA 104 and the CC 101, is used for delivering to the NTE 201a notification event occurring in the CC 101.

An NT-3 interface 212, an interface from the NTE 201 in the BSA 104 to the NTG 203 in the BSM 113, carries information necessary for the generation of an event notification or a notification message so that the NTG 203 can generate a notification message.

An NT-4 interface 213, an interface from the NTG 203 in the BSM 113 to the NTDA 202 in the BSD/A 108, is used for delivering a notification message generated in the NTG 203 to the NTDA 202 in order to further deliver the notification message to the BDS 131 or the IN 133, or for delivering an event occurring in the BSD/A 108 or the BDS 131 to the NTDA 202.

An NT-5 interface 214 is an interface used for directly delivering a notification message provided from the NTDA 202 in the BSD/A 108 to the Terminal 119 via the BDS 131 through a broadcast channel. The NT-5 interface 214 is used for delivering the notification message to a plurality of terminals.

An NT-6 interface 215 is an interface used for directly delivering a notification message provided from the NTDA 202 in the BSD/A 108 to the Terminal 119 via the IN 133. The NT-6 interface 215 is used for delivering the notification message to an individual terminal.

An NT-B1 interface 216 is used as a delivery path to be used in the BDS 131 by the BSD/A 108, or used as a reception path of event information generated in the BDS 131. The NT-B1 interface 216 is an interface between the BSD/A 108 and a BDS Service Distribution (BDS-SD) 130.

The NTE 201 controls the delivering of the information necessary for generating a notification message to the NTG 203, and the delivering of the information on generation of a notification event, if any, to the NTG 203. The NTG 203 controls the generating of a notification message using information and event necessary for generation of a notification message, received from the NTE 201, or the generating of a notification message upon receipt of a notification event from the BDS 131 or the IN 133 via the NTDA 202, and the delivering of the notification message to the NTDA 202. The NTG 203 can generate the notification message (i) when there is a need to re-notify of the start of the service, (ii) when there is a need to deliver a new mobile broadcast guide, as it receives from the CC 101a notice indicating a change in the service information, and (iii) when a particular event has occurred in the BDS 131 or the IN 133.

The NTDA 202 controls the delivering of a notification message via the NT-5 interface 214 or the NT-6 interface 215. In addition, upon receiving, from the BDS 131, information indicating a change in particular mobile broadcast service, for example, information indicating rate control or service impossibility due to the wireless network environment, the NTDA 202 delivers the corresponding notification event to the NTG 203 via the NT-4 interface 213.

Figure 3:
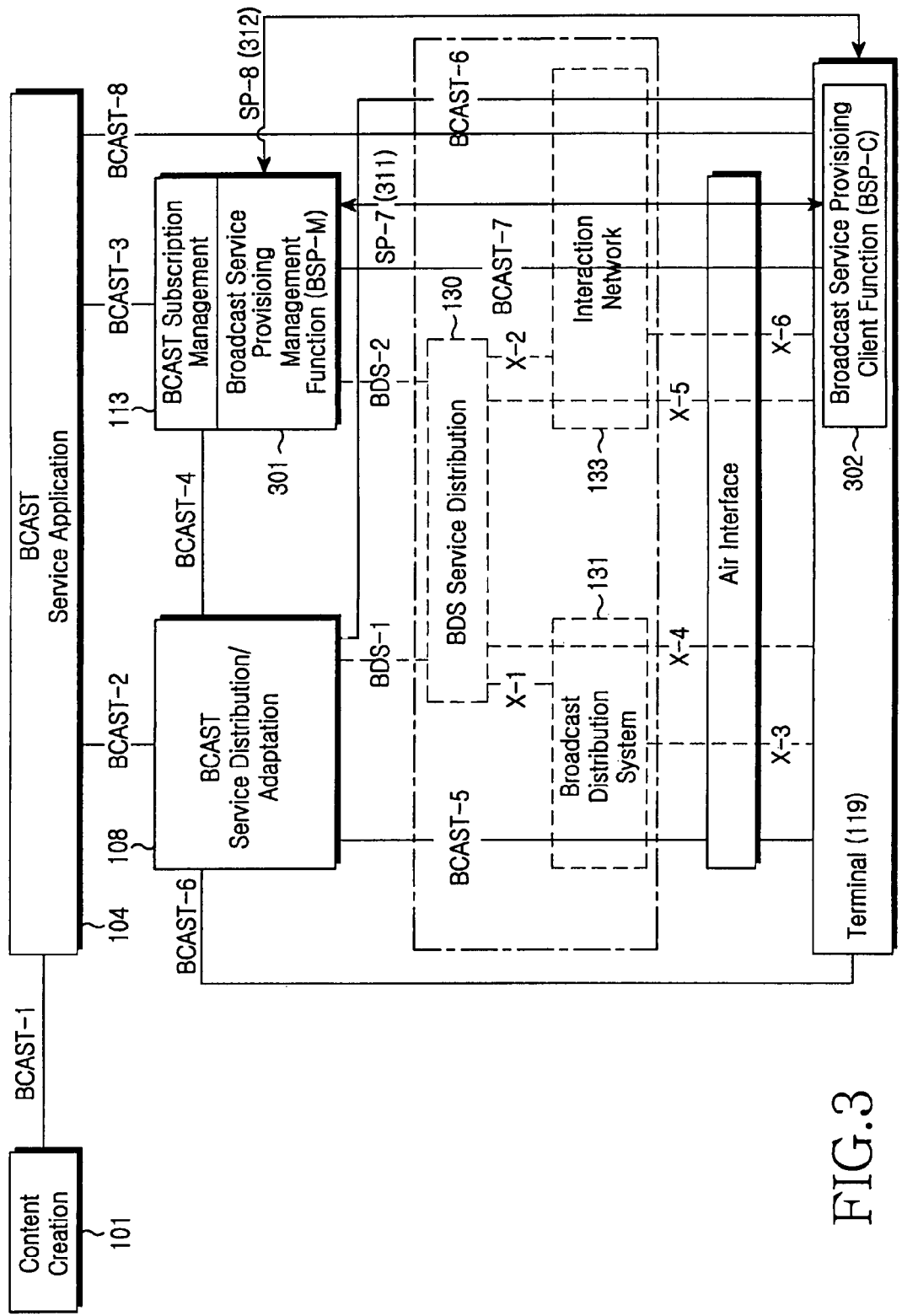
FIG. 3 illustrates architecture for service provisioning in a mobile broadcast system according to the first embodiment of the present invention.

FIG. 3 illustrates architecture for service provisioning in a mobile broadcast system according to the first embodiment of the present invention. The service provisioning architecture controls the user subscription to a BCAST service and purchasing procedures for the subscribed service. In addition, the service provisioning architecture provides additional information to process the payment and purchase, such as state information of user accounts.

Referring to FIG. 3, a Broadcast Service Provisioning Management (BSP-M) 301 provides subscription and purchase information. Based on user subscription information, the BSP-M 301 provides user charging information to the entities concerned, and supports charging for the mobile broadcast service. The BSP-M 301 receives a request and report for subscription and charging from a Broadcast Service Provisioning Client (BSP-C) 302 via an SP-7 interface 311 and an SP-8 interface 312. The BSP-C 302 controls the generation of a report on the subscription and purchase for the mobile broadcast service. The BSP-C 302 can request a subscription and purchase or request additional information depending on provisioning information extracted from a service guide. A description of the SP-7 interface 311 and the SP-8 interface 312 is shown in Table 5.

TABLE 5

| Interface | Reference Point | Usage |
|---|---|---|
| SP-7 | BCAST-7 | Delivery of messages used for a subscription such as subscription request of user and response from BCAST Subscription Management. Delivery of payment information |
| SP-8 | Out of band | The End User subscribes and purchases the services through the out-of-band interfaces. It's out of scope of OMA BCAST. |

Referring to Table 6, 'Name' indicates names of elements and attributes constituting the corresponding message. 'Type' indicates a type (Element or Attribute) of the corresponding name. The elements have values E1, E2, E3 and E4. E1 indicates an upper element for the entire message, E2 indicates a sub-element of E1, E3 indicates a sub-element of E2, and E4 indicates a sub-element of E3. An attribute is denoted by A, and A indicates an attribute of the corresponding element. For example, A under E1 indicates an attribute of E1. 'Category' is used for determining whether the corresponding element or attribute is mandatory or optional, and has an M value for the mandatory element or attribute, and an O value for the optional element or attribute. 'Cardinality' indicates a relationship between elements, and has values 0, 0 . . . 1, 1, 0 . . . n, 1 . . . n. Herein, 0 means an optional relationship, 1 means mandatory relationship, and n means that a plurality of values can be used. For example, 0 . . . n means that the corresponding message may have no element, or n elements. 'Description' indicates meaning of the corresponding element or attribute, and 'Data Type' indicates a data type for the corresponding element or attribute.

TABLE 6

| Name | Type | Category | Cardinality | Description | Data Type |
|---|---|---|---|---|---|
| | | | | | |

Figure 4:
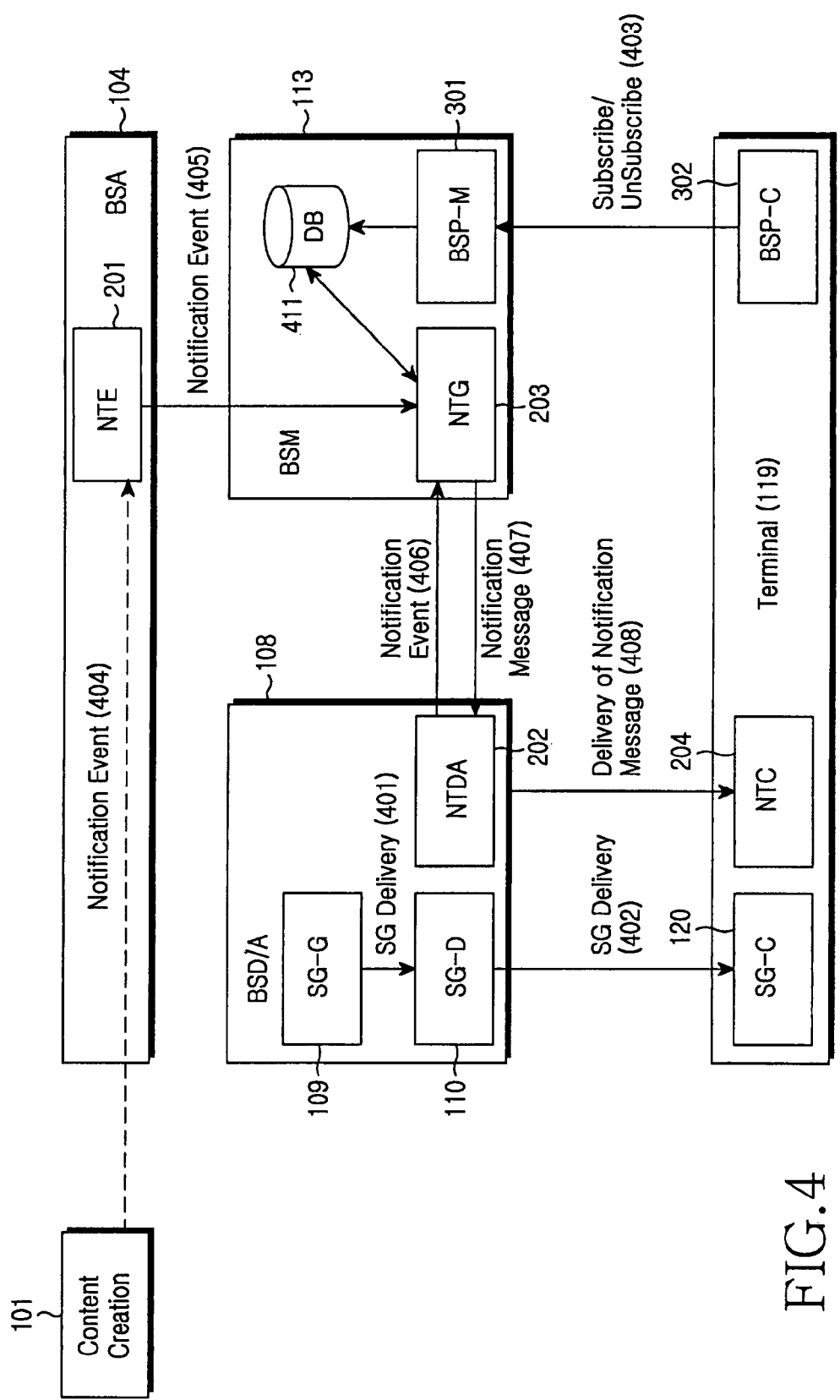
FIG. 4 illustrates architecture for delivering a notification message in a mobile broadcast system according to the first embodiment of the present invention.

FIG. 4 illustrates architecture for delivering a notification message in a mobile broadcast system according to the first embodiment of the present invention. For convenience, only the elements necessary for delivery of a notification message, among the entities described in FIGS. 1 to 3, are included in FIG. 4.

Referring to FIG. 4, an SG-G 109 generates in step 401 a service guide including time, purchase and access information related to the service and content, and then sends a request for a service guide delivery to an SG-D 110. The SG-D 110 then sends the service guide to a Terminal 119 in step 402. The service guide can be delivered via a BDS and/or an IN through a broadcast channel and/or interaction channel, respectively. When the service guide is delivered through the broadcast channel, the Terminal 119 receives the service guide from the session over which the service guide is delivered, and when the service guide is delivered through the interaction channel, the Terminal 119 accesses the IN and then receives the service guide in response to a corresponding request.

An SG-C 120 in the Terminal 119 controls the service guide reception from the SG-D 110, and the user acquires the service and content information from the received service guide. Based on the service guide, the user determines the subscription and purchase information for service, schedule, content, etc., and then makes a request for service provisioning such as subscription and purchase, using a BSP-C 302. For service-related notification message reception, the BSP-C 302 sends a subscription/unsubscription request to a BSP-M 301 in step 403.

Upon receipt of a request for user ID, device ID, and service/notification subscription information, the BSP-M 301 stores the corresponding user information in a DB 411 in a BSM 113. A notification event can occur in various network entities for providing a mobile broadcast service. In FIG. 4, the notification event can occur in CC 101, BSA 104, BSD/A 108, and BSM 113, and in steps 404 to 406, the CC 101, the BSA 104 and the BSD/A 108 send a request for notification message generation to an NTG 203.

The NTG 203 generates a notification message for the received event. After generating the notification message, the NTG 203 acquires from the DB 411 a target address TargetAddress to which it will deliver the notification message, and then generates a request message for message delivery. If there is any user who has set up a subscription to a message reception service through an interaction channel, the NTG 203 generates a request message including the information on the address where the corresponding user can receive the message.

The NTG 203 sends a request for the notification message delivery to an NTDA 202 in step 407. The NTDA 202 delivers the notification message to an NTC 204 in step 408. In this case, the NTDA 202 delivers the notification message through a broadcast channel or an interaction channel according to the target address.

The notification message can be roughly classified into a common notification message for a notification service and a service-specific notification message as a service-related auxiliary means. After receiving a service guide, the terminal or user can recognize the common notification message and/or the service-specific notification message according to the following procedure. The term 'notification service' refers to a service composed of notifications. For example, the notification service refers to a service that is delivered through a Short Message Service (SMS) or Multimedia Messaging Service (MMS) notification messages on a daily basis, like 'Today's Weather Information', 'Today's English', etc. The service-specific notification message as an auxiliary means is an example of an auxiliary service for a main program, rather than the independent notification service. For example, when a poll for the top music is conducted while a service 'Music Top 10' is on the air, and an SMS notification message for the poll is delivered to the televiewers for gathering the poll information, the notification message for the poll is the service-specific notification message as an auxiliary means. The notification service-refers to a service composed of only notifications, and the service-specific notification message refers to a notification message which may occur in a main program.

As for the notification service, when a service type ServiceType in a Service Fragment of a service guide has a Notification value, the terminal recognizes the corresponding service is a notification service.

As for a specific service in which a notification message is delivered, the terminal can recognize that it can receive the notification message related to the corresponding service (i) when an Access Fragment related to the service includes an element NotificationReception 904, (ii) when an element ServiceClass 903 in the Access Fragment related to the service has a URI value indicating 'sdo.oma.nt' or its similar Notification value, and (iii) when there is an element or attribute of the corresponding fragment indicating the possibility of receiving a notification message such as NTviaInteraction in a Service Fragment or a PurchaseItem Fragment.

Figure 5A:
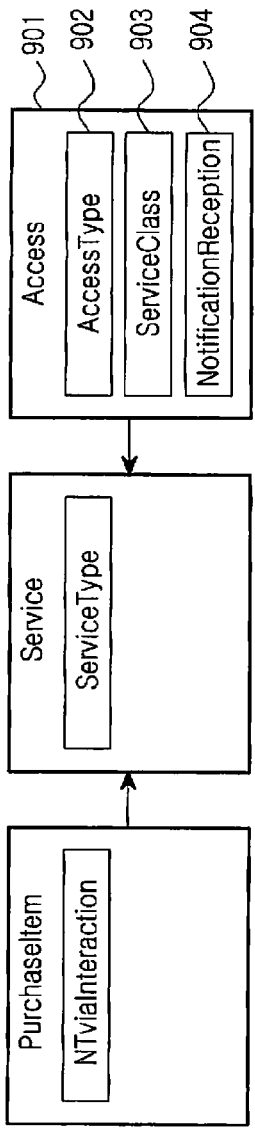
Figure 5B:
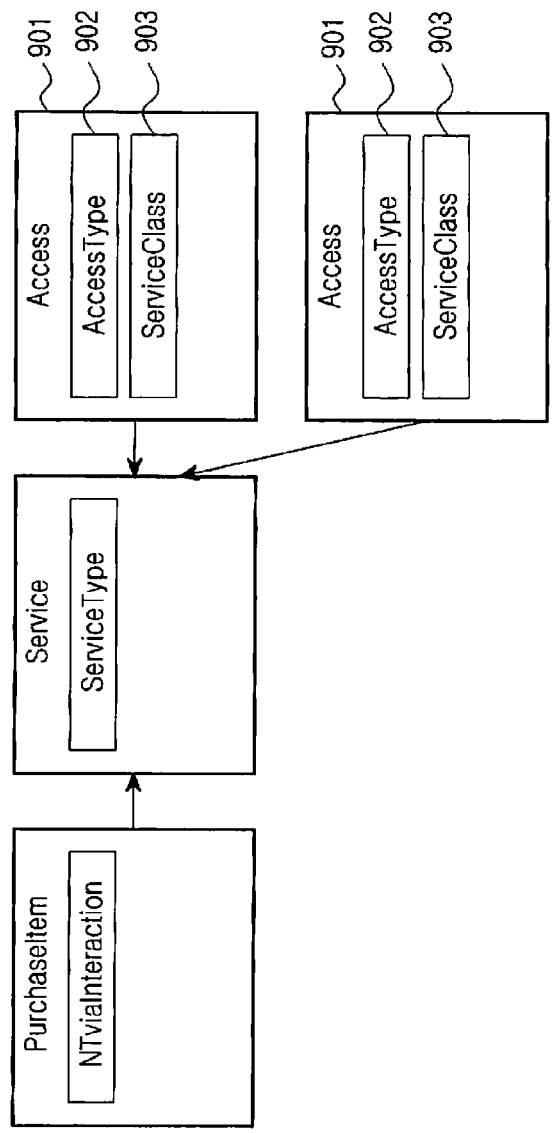
Figure 9A:
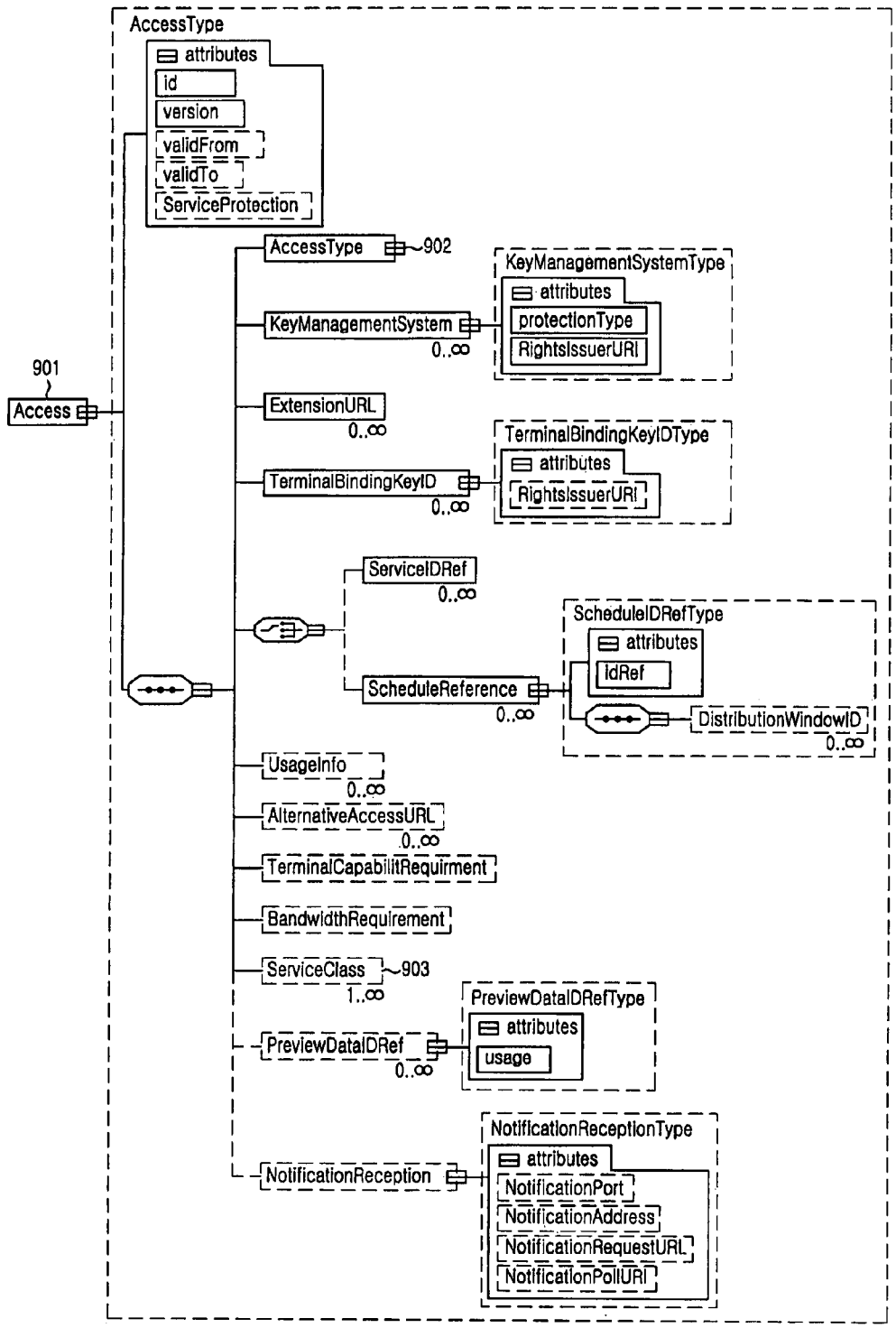
FIG. 9A illustrates an example of an Access fragment in a mobile broadcast system according to the first embodiment of the present invention.
Figure 9B:
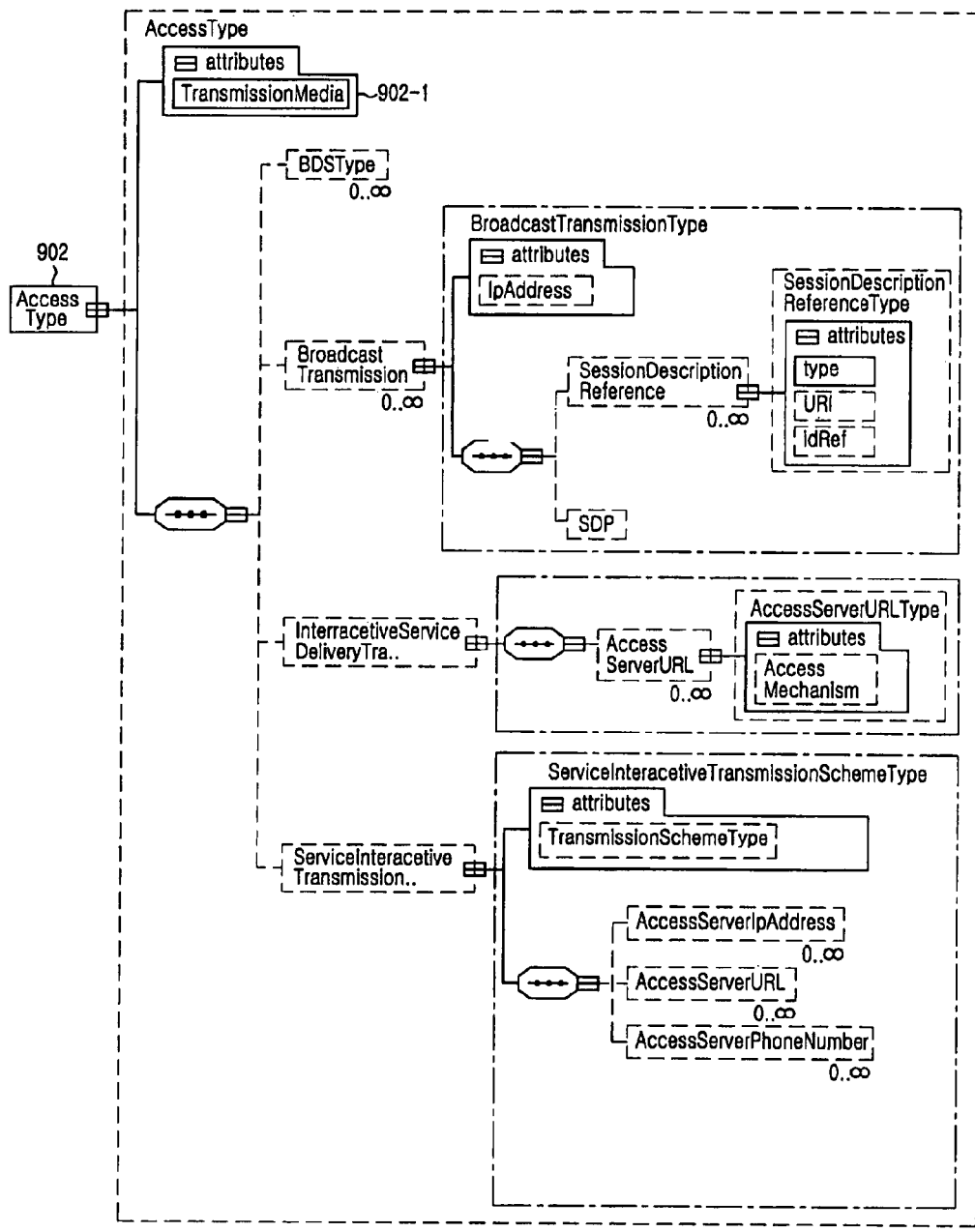
FIG. 9B illustrates Access Type in an Access fragment in a mobile broadcast system according to the first embodiment of the present invention.

FIGS. 5A to 5D illustrate detailed embodiments of a service guide including a Notification value in a mobile broadcast system according to the first embodiment of the present invention. Because the Access Fragment in FIGS. 5A and 5B is shown in detail in FIGS. 9A and 9B, reference will be made thereto.

FIG. 5A illustrates an example of an Access Fragment 901 containing Notification Reception information, and a Notification message related to the corresponding service has access information of a Notification delivered through a broadcast channel, included in an element NotificationReception 904, and contains information related to the corresponding service in an element AccessType 902.

FIG. 5B illustrates an example in which Accesses for a Service and a Notification message are included separately. Usage based on which information of the corresponding Access is distinguished, depends on a value of ServiceClass 903. For example, for a File Delivery service, AccessType 902 of an Access with ServiceClass 903='sdo.oma.fd' contains access information available for file downloading, and AccessType 902 of an Access with ServiceClass 903='sdo.oma.nt' contains access information for receiving a Notification.

FIG. 5C illustrates an exemplary configuration of a Service composed of only a Notification message in which ServiceType of a Service Fragment is Notification Service. One difference between FIG. 5A and FIG. 5C is that the Access Fragment contains address information for notification message reception, rather than the NotificationReception separately included in the Access Fragment.

FIG. 5D illustrates an exemplary configuration for the case where, for subscription/purchase for a service with a specific schedule, the corresponding service includes a Notification.

As described above, the terminal can recognize that the corresponding service is related to the Notification, when ServiceType is Notification Service, Access includes NotificationReception 904, or ServiceClass 903 of the Access is sdo.oma.nt.

Figure 6:
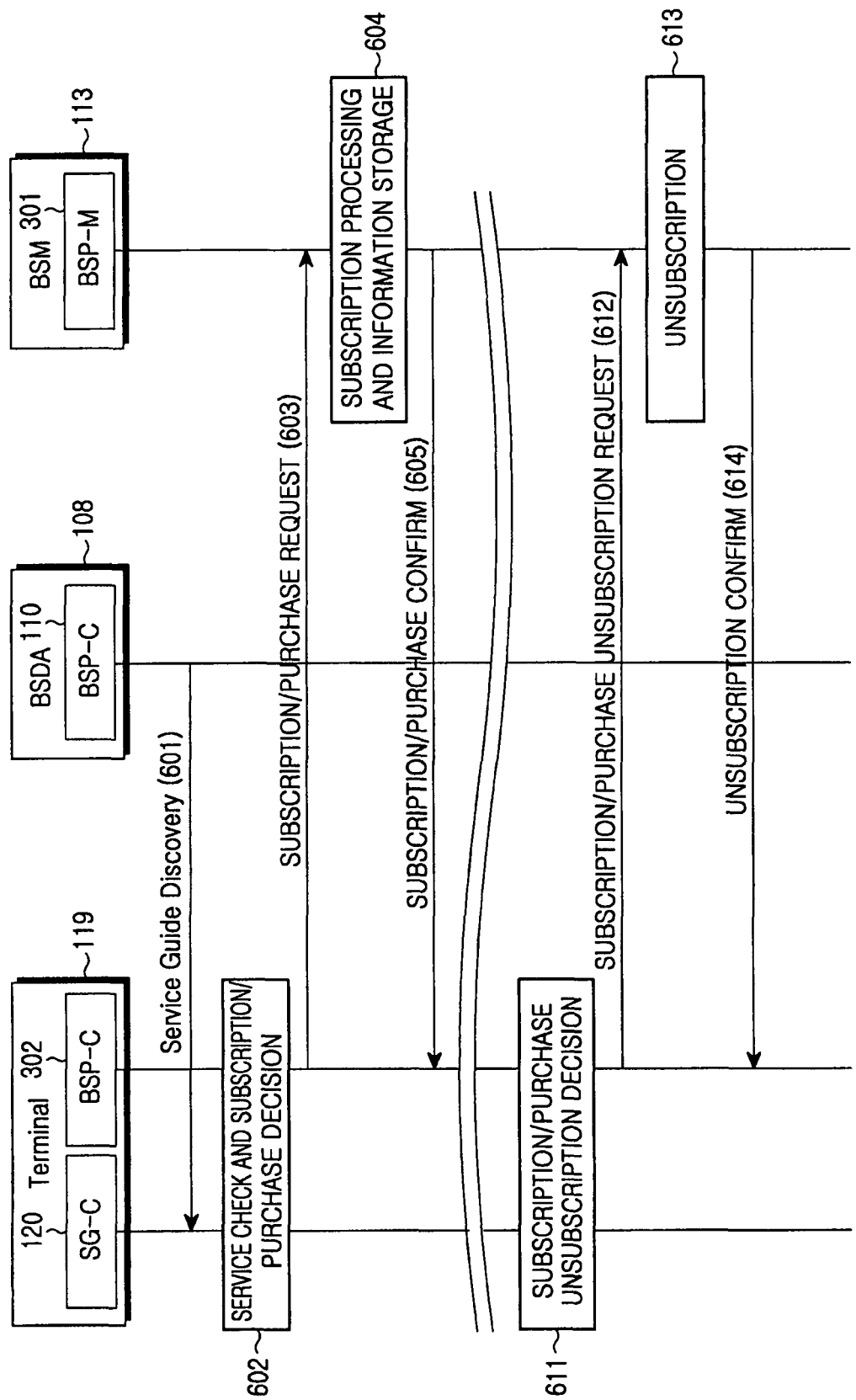
FIG. 6 illustrates subscription to Notification Message through an interaction channel in a mobile broadcast system according to the first embodiment of the present invention.

FIG. 6 illustrates subscription to Notification Message through an interaction channel in a mobile broadcast system according to the first embodiment of the present invention.

Referring to FIG. 6, a Terminal 119 receives a service guide in step 601. Thereafter, in step 602, the Terminal 119 checks, from the received service guide, Notification content using the service guide described in FIG. 5, determines whether the Terminal 119 will receive Notification through an interaction channel during service subscription/purchase, and then determines the subscription to the Notification Message.

An exemplary subscription request message for this is shown in Table 7A to 7C.

TABLE 7A

| Name | Type | Category | Cardinality | Description | Data Type |
|---|---|---|---|---|---|
| PR-7 Version | E | M | 1 | Version of PR-7interface supported by the terminal. The PR-7version number described by this specification is 1. | Integer |
| UserID | E | M | 1 | The user identity known to the BSM. | String |
| DeviceID | E | M | 1 | A unique device identification known to the BSM (e.g. the International Mobile Equipment Identity, IMEI). | String |
| RequestID | E | O | 1 | Identifier for the Service request message. | Integer |
| Service Protection Protocol | E | O | 1 | Lists each service protection protocol supported by the device, including the mandatory ones. Defined values: "ipsec," "srtp". The device is allowed to include more identifiers; however depending on the protocols supported by the network they may be ignored. [Note] This element is only included in the message if a service is to be delivered over Interaction channel. | String |
| Broadcast Mode | E | O | 1 | Indicates whether or not the device supports the optional broadcast mode of operation for rights acquisition, in addition to the interactive mode of operation. | "yes" or "no" |

TABLE 7B

| Name | Type | Category | Cardinality | Description | Data Type |
|---|---|---|---|---|---|
| BsdaID | E | M | 1 | Globally coordinated ID of the BSD/A. Note: This ID is used by BSM to retrieve service information from BSD/A. | anyUR |
| RiURL | E | O | 1 | The Rights Issuer URL, from which BSM can retrieve the ROAP triggers** that will be delivered to the device. | AnyURI |
| Purchase Item | E | M | 1...N | A list of items the user wants to order. | Complex type |
| Item ID | E1 | M | 1 | The ID of PurchaseItem fragment. Item IDs are advertised in the service guide and are inserted in this message in the same format. | anyURI |
| Order Option | E1 | O | 1 | The order option identifier. Possible order options are advertised in the service guide. | String |
| Price | E1 | O | 1 | The price known to the user. | Integer |
| Currency | A | O | 1 | The currency in which the price is expressed. If missing, a system default is assumed. Currency code is specified in [ISO4217] | String |

TABLE 7C

| Name | Type | Category | Cardinality | Description | Data Type |
|---|---|---|---|---|---|
| Authentication | E | O | 1 | The message authentication, | Base64-encoded binary |
| Notification | E | O | 0...1 | Subscription to receive Notification Message over Interaction Channel. If Notification = TRUE, it means Notification over Interaction Channel is subscribed. If Notification = FALSE, it means Notification over Interaction Channel should not be delivered. | Boolean |

In step 603, the Terminal 119 sends a request for subscription/purchase of Notification Message to a BSP-M 301 using a BSP-C 302. Thereafter, in step 604, the BSP-M 301 handles the subscription request message and stores the corresponding service and user information. After processing the corresponding event, the BSP-M 301 sends a response message to the subscription request to the BSP-C 302 in step 605. An example of the response message is shown in Table 8.

TABLE 8

| Name | Type | Category | Cardinality | Description | Data Type |
|---|---|---|---|---|---|
| Global Status Code | E | M | 1 | The overall outcome of the request, according to the return codes defined in Table 2. | Integer |
| Rights Validity EndTime | E | O | 0...N | The last time and date of validity of the Long-Term Key Message, after which it has to be renewed. [Note] this element is validated if RO is broadcasted. Otherwise, this element is not necessary. | DateTime |
| ID | A | M | 1 | The ID of the PurchaseItem fragment to which the validity end time is related. | anyURI |
| RequestID | E | O | 1 | Identifier for the corresponding Service request message. | Integer |
| Authentication | E | O | 1 | The message authentication, [Note] The method for message authentication is to be defined in 5.1.3 | Base64-encoded binary |
| Trigger | E | M | 1 | ROAP RO Acquisition Trigger**. The device is expected to use the trigger to initiate one or more Long-Term Key Message acquisitions. | MIME part |

If the Terminal 119 determines in step 611 that there is an unsubscription from the Notification Message after receiving the service, the BSP-C 302 sends an unsubscription request for the service subscription/purchase to the BSP-M 301 in step 612. An example of the unsubscription request message is shown in Table 9.

TABLE 9

| Name | Type | Category | Cardinality | Description | Data Type |
|---|---|---|---|---|---|
| PR-7 Version | E | M | 1 | Version of PR-7 interface supported by the terminal. ThePR-7 version number described by this specification is 1 | Integer |
| UserID | E | M | 1 | The user identity known to the BSM | String |
| DeviceID | E | O | 0 ... N | A unique device identification known to the BSM (e.g. the International Mobile Equipment Identity, IMEI). [Note] if a User has multiple devices, then this element indicates a device or a group of devices that a user want to unsubscribe | String |
| Purchase Item ID | E | M | 1 ... N | ID of the PurchaseItem Fragment the user wants to unsubscribe from. | anyURI |
| RequestID | E | O | 1 | Identifier for the Unsubscribe request message. | Integer |
| Authentication | E | O | 1 | The message authentication, [Note] The method for message authentication is to be defined in 5.1.3 | Base64-encoded binary |
| Notification | E | O | 0 ... 1 | Subscription to receive Notification Message over Interaction Channel. If Notification = TRUE, it means Notification over Interaction Channel is unsubscribed. If Notification = FALSE, it means Notification over Interaction Channel should not be delivered. | Boolean |

The BSP-M 301 handles the unsubscription request in step 613, and then sends a response message to the BSP-C 302 in step 614. An example of the response message is shown in Table 10.

TABLE 10

| Name | Type | Category | Cardinality | Description | Data Type |
|---|---|---|---|---|---|
| Global Status Code | E | M | 1 | The overall outcome of the request, according to the return codes defined in Table 2. | Integer |
| Unsubscribe InfoMessage | E | M | 1 ... N | For each subscription that was successfully removed, a message (in free text form) indicating when the cancellation of the subscription will become effective. | String |
| Purchase ItemID | A | M | 1 | The ID of the PurchaseItem fragment to which the message is related. | anyURI |
| RequestID | E | O | 1 | Identifier for the corresponding Unsubscribe request message. | Integer |
| Authentication | E | O | 1 | The message authentication, | Base64-encoded binary |

Figure 7:
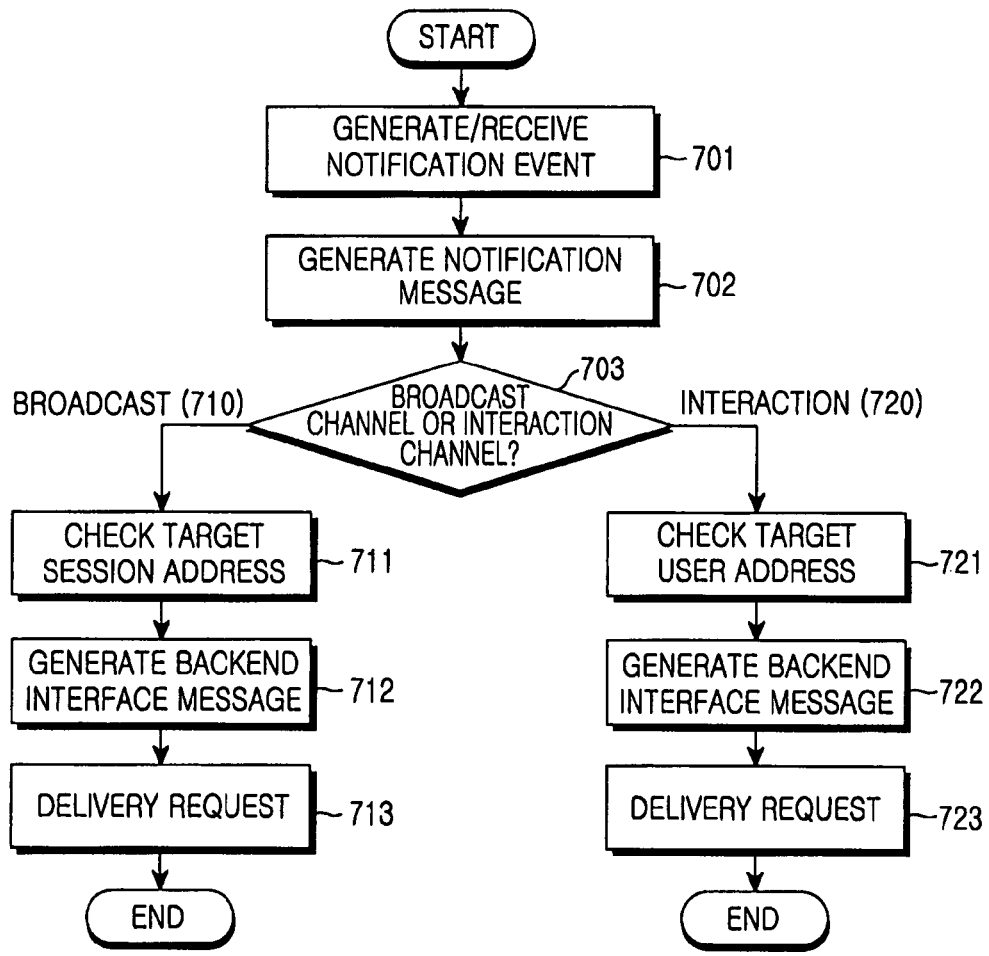
FIG. 7 illustrates a generation and request process for a Notification Event in a mobile broadcast system according to the first embodiment of the present invention.

FIG. 7 illustrates a generation and request process for a Notification Event in a mobile broadcast system according to the first embodiment of the present invention. This process shows a flow in which an NTG 203 receives a Notification Event, or generates a message for a Notification Event occurred in a BSM 113, and sends a request for message delivery.

Referring to FIG. 7, the NTG 203 has a Notification Event occurred in the BSM 113 or receives a Notification Event from another network entity in step 701. Table 11A and Table 11B show a request message for notification message generation from the corresponding network entities (for example, CC, BSA and BSD/A), for the Notification Event. In addition, Table 12 shows an example of a response message to the corresponding request message.

TABLE 11A

| Name | Type | Category | Cardinality | Description | Data Type |
|---|---|---|---|---|---|
| NTEReq | E | | | Specifies the delivery message of Notification Event for generating Notification Message. Contains the following attributes: NTEId EntityAddress DeliveryPriority Contains the following elements: NotificationEvent | |

TABLE 11A-continued

| Name | Type | Category | Cardinality | Description | Data Type |
|---|---|---|---|---|---|
| NTEId | A | M | 1 | Identifier of Notification Event | unsignedInt (32 bits) |
| EntityAddress | A | M | 1 | Network Entity Address to receive the response of this message. | anyURI |
| DeliveryPriority | A | O | 0 . . . 1 | Defines the priority of this notification event. This information is applied to generate Notification Message in NTG. NTG may be ignored this field | Boolean |

TABLE 11B

| Name | Type | Category | Cardinality | Description | Data Type |
|---|---|---|---|---|---|
| Notification Event | E1 | M | 1 . . . N | Specifies the Notification Event from CC, containing information from CC to be included into the notification message. It is RECOMMENDED that the information is delivered in the form of BCAST notification message format (as specified in Section 8.3). Other formats MAY be used. If BCAST notification message format is used, network-mandatory elements or attributes which are not relevant SHALL be delivered as empty field, network-optional elements or attributes which are not relevant SHALL NOT be instantiated. Contains attribute: Namespace | |
| Namespace | A | O | 0 . . . 1 | Set to the name of the BCAST notification XML namespace to signal that the content of NotificationEvent is compliant with BCAST notification message format. | anyURI |

TABLE 12

| Name | Type | Category | Cardinality | Description | Data Type |
|---|---|---|---|---|---|
| NTERes | | | | Specifies the Response message for NTEReq. Contains the following elements: NTEid | |
| NTEid | E1 | M | 1 . . . N | Identifier of NTEReq Message Contains the following attributes: StatusCode | unsignedInt (32 bits) |
| StatusCode | A | M | 1 | Indicates the overall outcome how NTEReq is processed, according to the global status code (as specified in Appendix G). | unsignedByte |

After a Notification Event occurs or a Notification Event is received from another network entity, the NTG 203 generates a notification message in step 702. Thereafter, in step 703, the NTG 203 determines through which path it will deliver the corresponding notification message. The notification message can be delivered through either one or both of a broadcast channel and an interaction channel. When the NTG 203 determines to deliver the notification message through a broadcast channel 710, the NTG 203 checks in step 711 a Target Session Address to which it will deliver the corresponding notification message. In step 712, the NTG 203 generates in step 712 a delivery request message for requesting the notification message delivery, including the corresponding TargetAddress, and sends a request for the delivery of a notification message to an NTDA 202 in step 713.

However, if the NTG 203 determines to deliver the notification message through an interaction channel 720, the NTG 203 checks in step 721 a Target User Address of the user who has agreed/subscribed to receive the notification message through an interaction channel. Thereafter, in step 722, the NTG 203 generates a delivery request message for requesting notification message delivery, including TargetAddress of every user related to the notification message. In this case, if there are many users, the NTG 203 can generate several delivery request messages for the same notification message. Thereafter, in step 723, the NTG 203 sends the corresponding notification delivery message to the NTDA 202.

Figure 8:
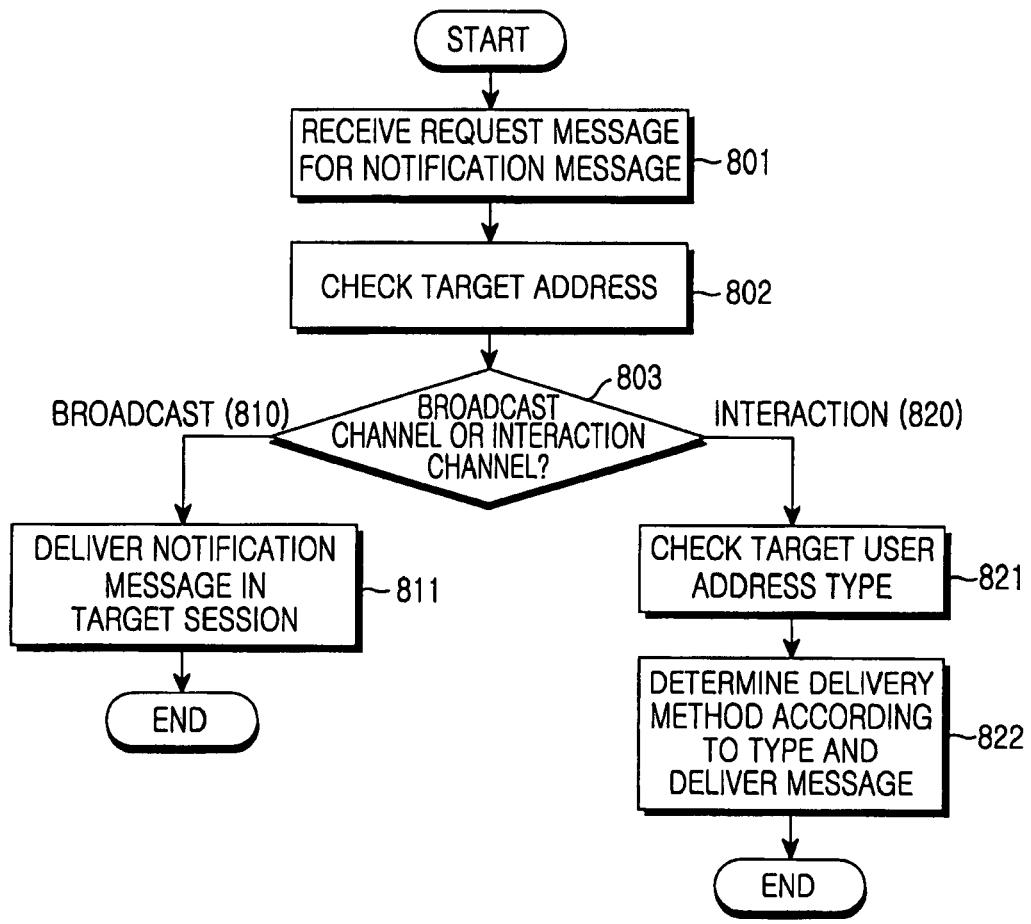
FIG. 8 illustrates a process in which an NTDA delivers a notification message to a terminal upon receipt of a delivery request for the notification message from an NTG.

FIG. 8 illustrates a process in which an NTDA 202 delivers a notification message to a terminal upon receipt of a delivery request for the notification message from an NTG 203.

Referring to FIG. 8, the NTDA 202 receives a delivery request message for a notification message in step 801. Table 13A to Table 13C show an example of the delivery request message for the notification message, delivered from the NTG 203 to the NTDA 202. Table 14 shows an example of a response message thereto.

TABLE 13A

| Name | Type | Category | Cardinality | Description | Data Type |
|---|---|---|---|---|---|
| NTDReq | E | | | Specifies the Request message of Notification Message Delivery from NTG to NTDA. Contains the following attributes: NTDReqid EntityAddress DeliveryPriority Contains the following elements: TargetAddress NotificationMessage | |
| NTDReqid | A | M | 1 | Identifier of NTDReq | unsignedInt (32 bits) |
| EntityAddress | A | M | 1 | Network Entity Address to receive the response of this message. | anyURI |
| DeliveryPriority | A | O | 0 . . . 1 | Defines the delivery priority of this Notification Message. NTG can request NTDA to deliver this notification message as high priority. If priority = TRUE, it means high priority. If priority = FALSE, it means general message. | Boolean |

TABLE 13B

| Name | Type | Category | Cardinality | Description | Data Type |
|---|---|---|---|---|---|
| TargetAddress | E1 | O | 0 . . . N | Specifies TargetAddress to deliver Notification Message. For service-specific notification, AccessID or IPAddress under NotificationReception in AccessFragment can be possible value. If Notification message should be delivered over interaction channel, the value can be e-mail address, IMSI, etc. If not given, Notification message SHALL be delivered to all users using SGDD. Contains the following attributes: DeliveryChannel AddressType | String |
| DeliveryChannel | A | M | 1 | 1Specifies the delivery channel If DeliveryChannel == 0, Notification Message SHALL be delivered over Broadcast Channel. If DeliveryChannel == 1, Notification Message SHALL be delivered over Interaction Channel. | Boolean |
| AddressType | A | M | 1 | Specifies the type of TargetAddress Value 0 - IPAddress 2 - anyURI 3 - IMSI 4-200: For Future Use 201-255: For Proprietary Use | unsignedByte |

TABLE 13C

| Name | Type | Category | Cardinality | Description | Data Type |
|---|---|---|---|---|---|
| Notification Message | E1 | M | 1 . . . N | Specifies the Notification Message, containing information to be included into the Notification Message. It is RECOMMENDED that the information is delivered in the form of BCAST Notification Message format (as specified in section 8.3). Other formats MAY be used. If BCAST Notification Message format is used, network-mandatory elements or attributes which are not relevant SHALL be delivered as empty field, network-optional elements or attributes which are not relevant SHALL NOT be instantiated. Contains the following attribute: Namespace | |
| Namespace | A | O | 0 . . . 1 | Set to the name of the BCAST notification XML namespace to signal that the content of NotificationEvent is compliant with BCAST Notification Message format. | anyURI |

TABLE 14

| Name | Type | Category | Cardinality | Description | Data Type |
|---|---|---|---|---|---|
| NTDRes | | | | Specifies the Response message for NTDReq. Contains the following elements: NTDReqid | |
| NTDReqid | E1 | M | 1...N | Identifier of NTDReq Message Contains the following attributes: StatusCode | unsignedInt (32 bits) |
| StatusCode | A | M | 1 | Indicates the overall outcome how NTDReq is processed, according to the global status code (as specified in Appendix G) | unsignedByte |

In step 802, the NTDA 202 checks a Target Address included in the request message. Thereafter, the NTDA 202 determines in step 803 whether it will use a broadcast channel or an interaction channel for message delivery, by parsing the TargetAddress information. If the NTDA 202 determines to use a broadcast channel 810 for message delivery, the NTDA 202 checks, in step 811, Session information such as IP address from TargetAddress information in the request message, and then delivers a notification message in the corresponding session.

However, if the NTDA 202 determines to use an interaction channel 820, the NTDA 202 checks a type of TargetAddress in step 821. Thereafter, in step 822, the NTDA 202 determines a delivery method according to type of the target address and then delivers the notification message using the delivery message.

Table 15 to Table 17 show an exemplary method for subscription/unsubscription to/from Notification Message for each individual service in the notification message subscription described in FIG. 6.

TABLE 15

| Name | Type | Category | Cardinality | Description | Data Type |
|---|---|---|---|---|---|
| ServiceID | E | O | 0...1 | Unique ID of Service. It can be ID of Service Fragment or GlobalServiceID Contains the following attributes: Notification | anyURI |
| Notification | A | M | 1 | Subscription to receive Notification Message related to the Service over Interaction Channel. If Notification = TRUE, it means Notification over Interaction Channel is subscribed. If Notification = FALSE, it means Notification over Interaction Channel should not be delivered. | Boolean |

TABLE 16

| Name | Type | Category | Cardinality | Description | Data Type |
|---|---|---|---|---|---|
| ServiceID | E | O | 0...1 | Unique ID of Service. It can be ID of Service Fragment or GlobalServiceID Contains the following attributes: Notification | anyURI |
| Notification | A | M | 1 | Un-subscription to receive Notification Message over Interaction Channel. If Notification = TRUE, it means Notification over Interaction Channel is unsubscribed. If Notification = FALSE or value is not present, it means current subscription of notification message will be kept. | Boolean |

TABLE 17

| Name | Type | Category | Cardinality | Description | Data Type |
|---|---|---|---|---|---|
| KeepSubscription | A | O | 0...1 | Keep current subscription of PurchaseItem. When User keep current subscription of PurchaseItem and would like to unsubscribe relevant notification reception over interaction channel. This field will be needed and set TRUE. If this element is not present or value is FALSE, it means PurchaseItem and its relevant notification will be unsubscribed. | Boolean |

Table 15 shows a message for the case where for subscription to PurchaseItem or Service Bundle, notification message reception for a specific service is selected from among the services included in the corresponding bundle. An element and its associated attribute in Table 15 are delivered with the request message during the service subscription in step 603 of FIG. 6. If ServiceID-specific notification message reception is desired, an attribute Notification is set to TRUE, and if ServiceID-specific notification message reception is not desired, the attribute Notification is set to FALSE.

Table 16 shows a message for the case where an unsubscription from notification message reception for a particular service among the services included in PurchaseItem or Service Bundle is made. An element and its associated attribute in Table 16 are delivered along with the request message during the service unsubscription in step 612 of FIG. 6. If ServiceID-specific notification message unsubscription is desired, an attribute Notification is set to TRUE. If the attribute Notification is set to FALSE or there is no attribute Notification, it means that the user keeps its current subscription. If the user requests an unsubscription from the corresponding PurchaseItem or Service Bundle, every associated service and notification message reception undergo unsubscription without the need for service-specific selection through Table 16. However, if the user desires a notification message of unsubscription for a particular service while keeping its subscription to the PurchaseItem or Service Bundle, Table 16 and Table 17 are included in an unsubscription message, and an attribute in Table 17 is set to TRUE, and unsubscription from notification message reception can be selected for each individual service using Table 16.

Figure 10:
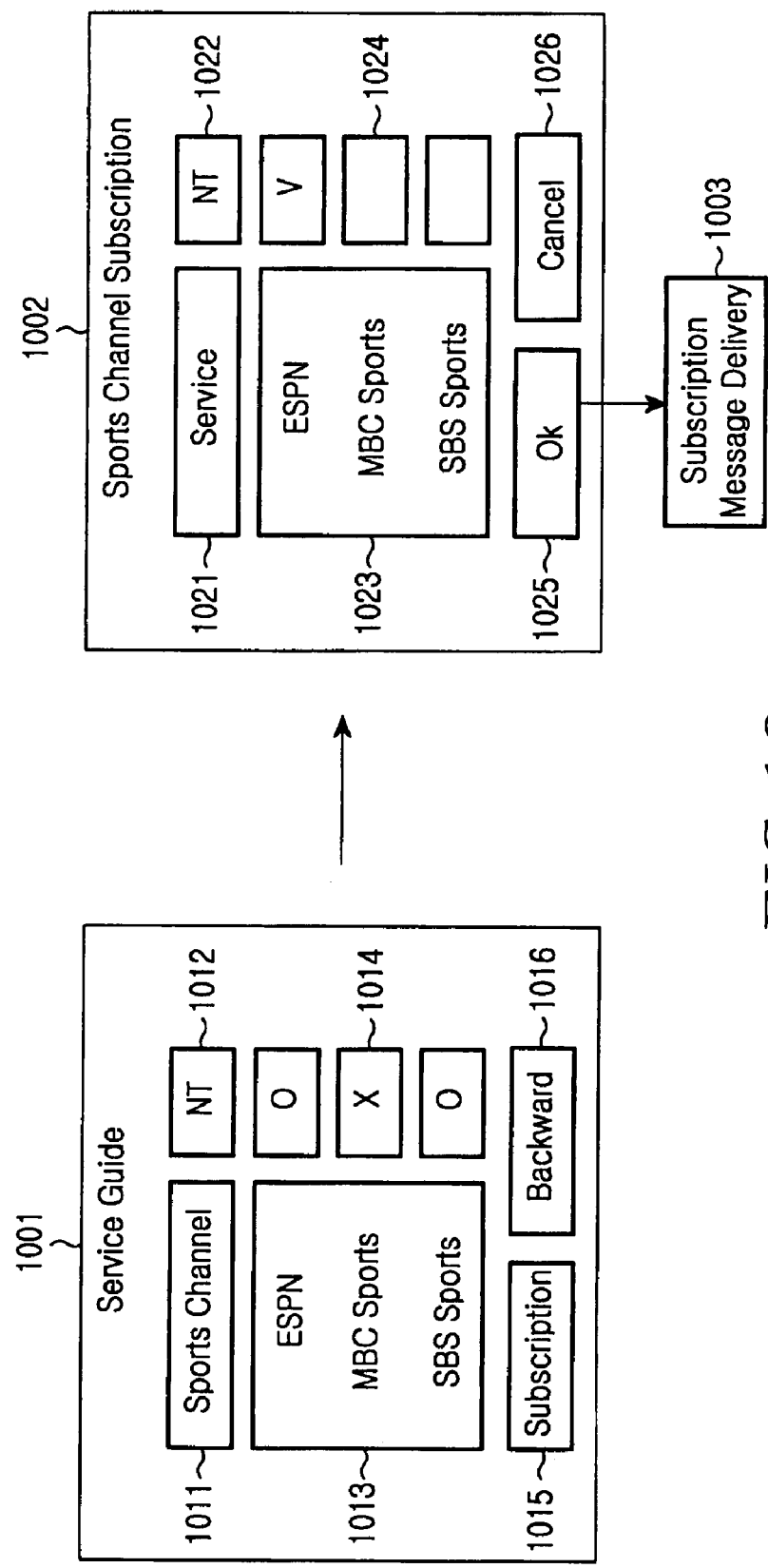
FIG. 10 illustrates an exemplary screen of a user terminal through a service guide reception method in a mobile broadcast system according to the first embodiment of the present invention.

FIG. 10 illustrates an exemplary screen of a user terminal through a service guide reception method in a mobile broadcast system according to the first embodiment of the present invention. Shown is a method and process for subscription to Notification Message while making subscription to PurchaseItem through the service guide reception.

After a user terminal receives a service guide, the user can check the service and content information, and can also check the service bundle information through PurchaseItem information. The user terminal can display service guide content on a terminal screen 1001 so that the user may check the service content. The terminal screen 1001 is an exemplary screen for a sport channel bundle. Reference numeral 1011 indicates a service bundle name as a Title of PurchaseItem, and reference numeral 1013 shows a service list included in the corresponding bundle.

With use of reference numerals 1012 and 1014, the user determines whether a Notification Message is provided through an Interaction for each individual service. In this embodiment, only ESPN and SBS Sports provide a notification message through an Interaction. If the user subscribes to the service using a Subscription button 1015, the screen 1001 transitions to a subscription message generation screen 1002. If the user desires to receive a notification message through an Interaction in a specific service, he/she selects it in a check box 1024 and requests a subscription to a service and the relevant notification message using a button 1025, and the corresponding information is delivered to a BSM through a Service Provisioning subscription message including Table 15, completing the subscription. Unsubscription is also performed using a similar method.

A description will now be made of a notification message delivery method in a Digital Video Broadcasting-Convergence of Broadcasting and Mobile Service (DVB-CBMS) system according to a second embodiment of the present invention.

Although the terms for the network entities, interfaces, and information delivered between the network entities and a terminal, used in the second embodiment of the present invention, are mapped to the terms used in DVB-CBMS WG, for convenience, this is to show that the present invention can be applied to a similar broadcast system, but is not intended to limit the scope of the present invention.

Figure 11:
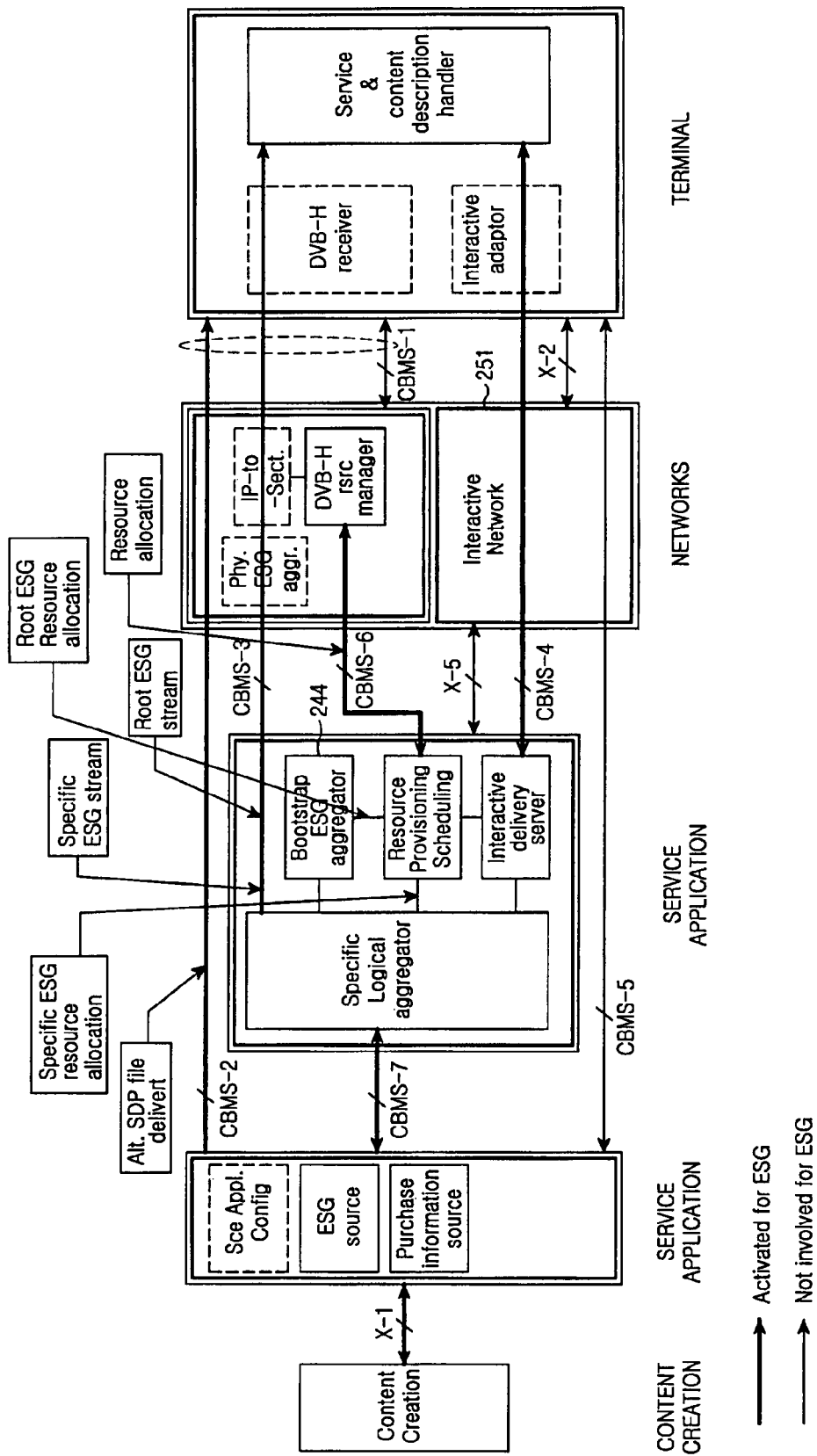
FIG. 11 illustrates a CBMS-based Electronic Service Guide (ESG) delivery architecture in a mobile broadcast system according to a second embodiment of the present invention.

FIG. 11 illustrates a CBMS-based Electronic Service Guide (ESG) delivery architecture mapped to the architecture of FIG. 1. A definition of the network entities used in FIG. 11 is given in Table 18. Of the entities shown in FIG. 11, 'Specific Logical ESG aggregator' is an important entity in the present invention, and has a combined function of the SG-D 110 and the SG-G 109 of FIG. 1, i.e. controls the generating and delivering of an ESG.

TABLE 18

| Logical sub-entity | Logical Entity it is part of | Involved Ref. Points | Description |
| --- | --- | --- | --- |
| ESG Source | Service Application | CBMS-7, CBMS-2 | Service application specific source of ESG fragments, comprising attraction information, acquisition information (coming from Service application configuration sub-entity) and purchase information SDP files, which are part of acquisition information, may be delivered separately from the ESG. In that case the service application may deliver the SDP files over the CBMS-2 reference point. |
| ESG purchase information | Service Application | Internal to SA | Source of purchasing information contributed to the ESG. Service application may rely on other sources for obtaining this information. |
| Specific logical ESG aggregator | Service Management | CBMS-7 CBMS-3 | Entity receiving ESG information blocks from one or more service applications, aggregating them into one ESG (as perceived by the end User), and generating consistent set of ESG information blocks, including containers; information blocks are output to physical ESG aggregator<br>ESG logical aggregator is responsible for managing container versions<br>A service application may contribute to more than one Logical ESG aggregator. |
| Bootstrap ESG aggregator | Service Management | CBMS-3 | Entity receiving the ESG announcement information from all specific aggregators and generating the bootstrap ESG stream. |

TABLE 18-continued

| Logical sub-entity | Logical Entity it is part of | Involved Ref. Points | Description |
|---|---|---|---|
| Resource provisioning & scheduling | Service Management | CBMS-6 | Used here for specific configuration of ESG delivery |
| Interactive delivery server | Service Management | CBMS-4 | Provides point-to-point access (pull or push) to ESG through interactive network |
| Physical ESG aggregator | Broadcast Network | CBMS-3 | Entity receiving ESG information blocks (e.g. containers) from one or more logical ESG aggregators, putting them into FLUTE carousel(s) and optimizing mapping on DVB-H bursts (e.g. avoiding ESG information fragmentation over multiple bursts) |
| DVB-H resource manager | Broadcast Network | CBMS-6 | See description in service configuration section |
| IP-to-section mapper | Broadcast Network | CBMS-6 | Entity in charge of encapsulation the IP datagrams into the DVB-H MPE sections and generate MPE-FEC sections by performing MPE-FEC encoding. Usually part of an IP encapsulator. |
| Service and content description handler | Terminal | CBMS-3 | Receives and aggregates subset of or all ESG information blocks, maintains them up-to-data, and makes them available to the ESG application Presentation of and interaction with ESG information is Out of scope of this specification |

Figure 12:
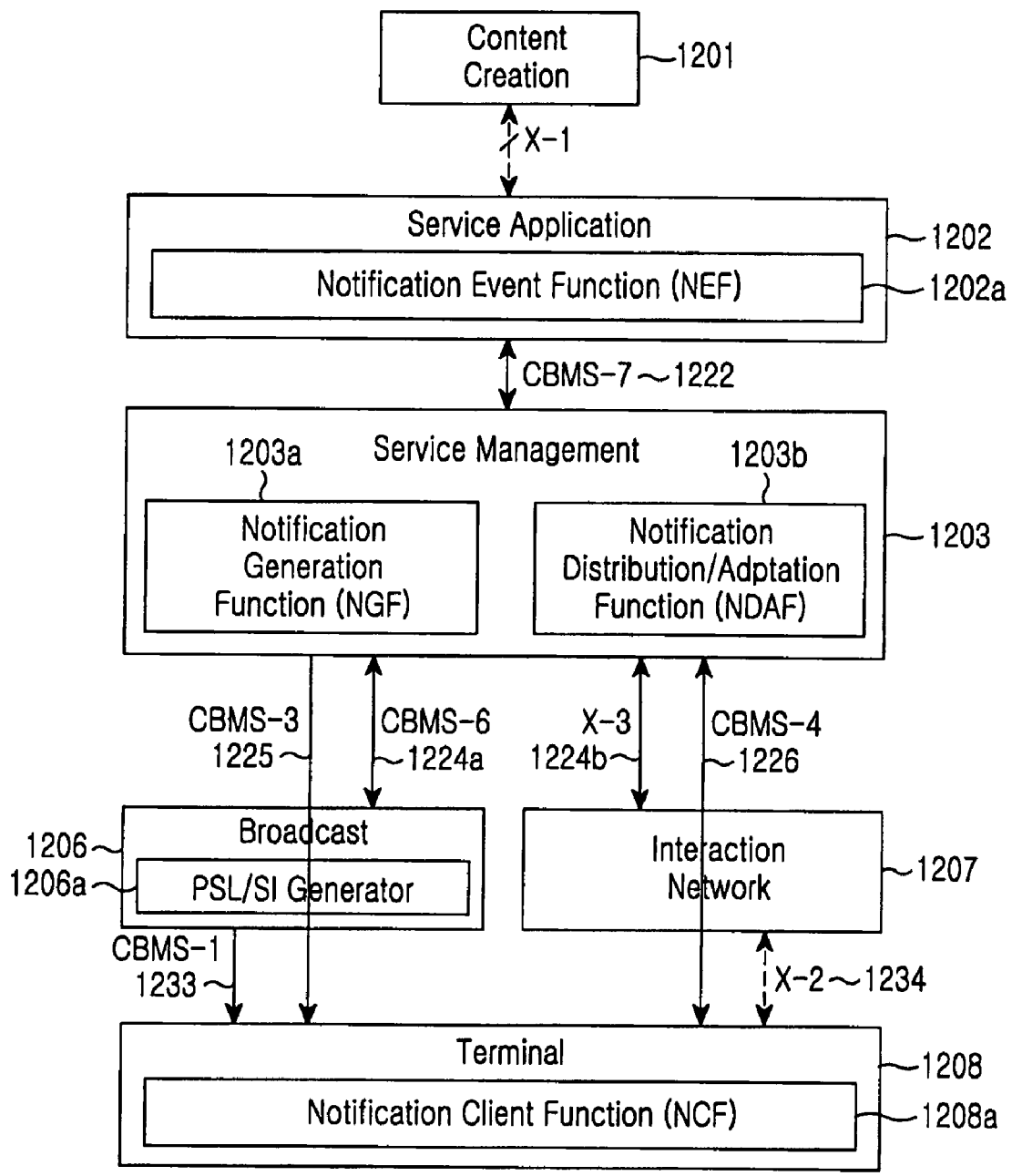
FIG. 12 illustrates CBMS network entities for delivering a notification message in a mobile broadcast system according to the second embodiment of the present invention.

FIG. 12 illustrates an architecture corresponding to the OMA-based architecture of FIG. 2. Shown are structures of the network entities for delivering a notification message in CBMS.

Referring to FIG. 12, a Content Creation (CC) 1201 is a provider of a broadcast service, and the broadcast service can include the conventional audio/video broadcast service, music/data file download service, and the like. If there is any problem or change in the provisioning of the broadcast service, the CC 1201 notifies the change to a Notification Event Function (NEF) 1202a in a Service Application (SA) 1202. The NEF 1202a delivers a notification event to a Notification Generation Function (NGF) 1203a based on the received event.

The SA 1202 controls the processing of the content data of a broadcast service, provided from the CC 1201, into a format (for example, audio/video streaming, or movie downloading) suitable for a broadcast network, in order to generate broadcast service data, the generating of the standardized metadata necessary for a service guide, and the generating of the charging information for users. In addition, for a change in the broadcast service, provided from the CC 1201, the SA 1202 delivers a notification event to the NGF 1203a in a Service Management (SM) 1203 and provides service guide attribute information used for generation of a notification message to the NGF 1203a.

The SM 1203 controls the determining of the delivery scheduling for the broadcast service provided from the SA 1202 and the generating of a service guide, and is connected to a DVB-H network 1206 supporting a broadcast channel and an Interaction Network 1207 supporting an interaction channel. In addition, the SM 1203, having a Notification Distribution/Adaptation Function (NDAF) 1203b therein, receives a notification message delivered from the SM 1203, and delivers the notification message to one terminal or a group of terminals via the broadcast network 1206 or an interaction network 1207. The SM 1203 has session information needed by the NGF 1203a to generate a notification message for a terminal. The session information is provided from the NDAF 1203b to the NGF 1203a.

The SM 1203 manages subscription information for the receipt of a broadcast service and the service provisioning information such as information indicating whether the user has purchased the relevant content, and also manages device information for the terminals receiving the broadcast service. In addition, the SM 1203 delivers user charging information to the SA 1202, and provides the subscription information, service provisioning information, and device information to the broadcast network 1206 and the interaction network 1207. In particular, the SM 1203, as it includes the NGF 1203a, generates a notification message for a notification event indicating an occurrence, if any, of an addition of a new function or a change in the existing function, provided from Content Creation 101, SA 1202, SM 1203 and broadcast network 1206, or generates a notification message for a self event indicating that the broadcast service provides content, i.e. the corresponding broadcast service, will be provided after a lapse of a predetermined time.

The broadcast network 1206 is a network for delivering the broadcast service. Herein, a DVB-H network is used as the broadcast network 1206, by way of example. If there is any change in the delivering of the broadcast service, the broadcast network 1206 controls the notifying of the change to the SM 1203 via a CBMS-6 interface 1224a or an X-3 interface 1224b.

The interaction network 1207 delivers the broadcast service on a point-to-point basis, or interactively exchanges control information and additional information related to broadcast service reception. For example, the interaction network 1207 can be the existing cellular network such as a 3GPP Wideband Code Division Multiple Access (WCDMA) network.

A Terminal 1208 is a terminal capable of receiving the broadcast service, and has a function capable of connecting with a cellular network according to terminal capability. The Terminal 1208 is assumed to be a terminal that can be connected to the cellular network. With use of a Notification Client Function (NCF) 1208a, the Terminal 1208 receives a notification message delivered via a CBMS-5 interface 1225 and perform an operation appropriate thereto, or receives a notification message delivered via a CBMS-4 interface 1226 and perform an operation appropriate thereto.

A CBMS-7 interface 1222 is an interface from the NEF 1202a in the SA 1202 to the NGF 1203a in the SM 1203, and carries information (for example, attribute information of a service guide) necessary for the generation of an event notification or a notification message so that the NGF 1203a can generate a notification message.

A CBMS-3 interface 1225 is an interface used when a notification message, delivered from the NDAF 1203b in the SM 1203, is directly delivered to the Terminal 1208 via the broadcast network 1206 through a broadcast channel. This interface is used for delivering a notification message to one or multiple terminals.

A CBMS-4 interface 1226 is an interface used when a notification message, delivered from the NDAF 1203b in the SM 1203, is directly delivered to the Terminal 1208 via the interaction network 1207 through a dedicated channel to the Terminal 1208, or through a broadcast channel provided in the interaction network 1207. This interface is used for delivering a notification message to one or multiple terminals.

A CBMS-6 interface 1224a is an interface between the SM 1203 and the broadcast network 1206, used for establishing a delivery path to be used by the SM 1203 in the broadcast network 1206, or a reception path for event information generated in the broadcast network 1206.

An X-3 interface 1224b is an interface used for establishing a delivery path to be used between the SM 1203 and the interaction network 1207.

A CBMS-1 interface 1233 is an interface through which control information of the broadcast network 1206 will be carried to the Terminal 1208. In DVB-H, a control signal channel called a Program Specific Information/Service Information (PSI/SI) corresponds to this interface.

The NEF 1202a controls the delivering of the information necessary for generating a notification message to the NGF 1203a, and the delivering of the information indicating occurrence, if any, of a notification event to the NGF 1203a. The NGF 1203a controls the generating of a notification message using information and event necessary for the generation of a notification message, received from the NEF 1202a, or the generating of a notification message upon receipt of a notification event from the broadcast network 1206 via the NDAF 1203b, and the delivering of the notification message to the NDAF 1203b. The NGF 1203a can generate the notification message (i) when there is a need to re-notify of a start of the service, (ii) when there is a need to deliver a new service guide when it receives from the CC 1201 a notice indicating a change in the service information, and (iii) when a particular event has occurred in the broadcast network 1206.

The NDAF 1203b controls the delivering of a notification message via the CBMS-3 interface 1225 or the CBMS-4 interface 1226. In addition, upon receiving, from the broadcast network 1206, information indicating a change in a particular mobile broadcast service, for example, information indicating a rate control or a service impossibility due to the wireless network environment, the NDAF 1203b delivers the corresponding notification event to the NGF 1203a.

Compared with the entities of FIG. 2, the network entities corresponding to a notification message are equal to those in OMA and CBMS in terms of the definition and names, so a description thereof is not provided herein. As to the interfaces, the NT-6 corresponds to the CBMS-4, and the NT-5 corresponds to the CBMS-3.

Figure 13:
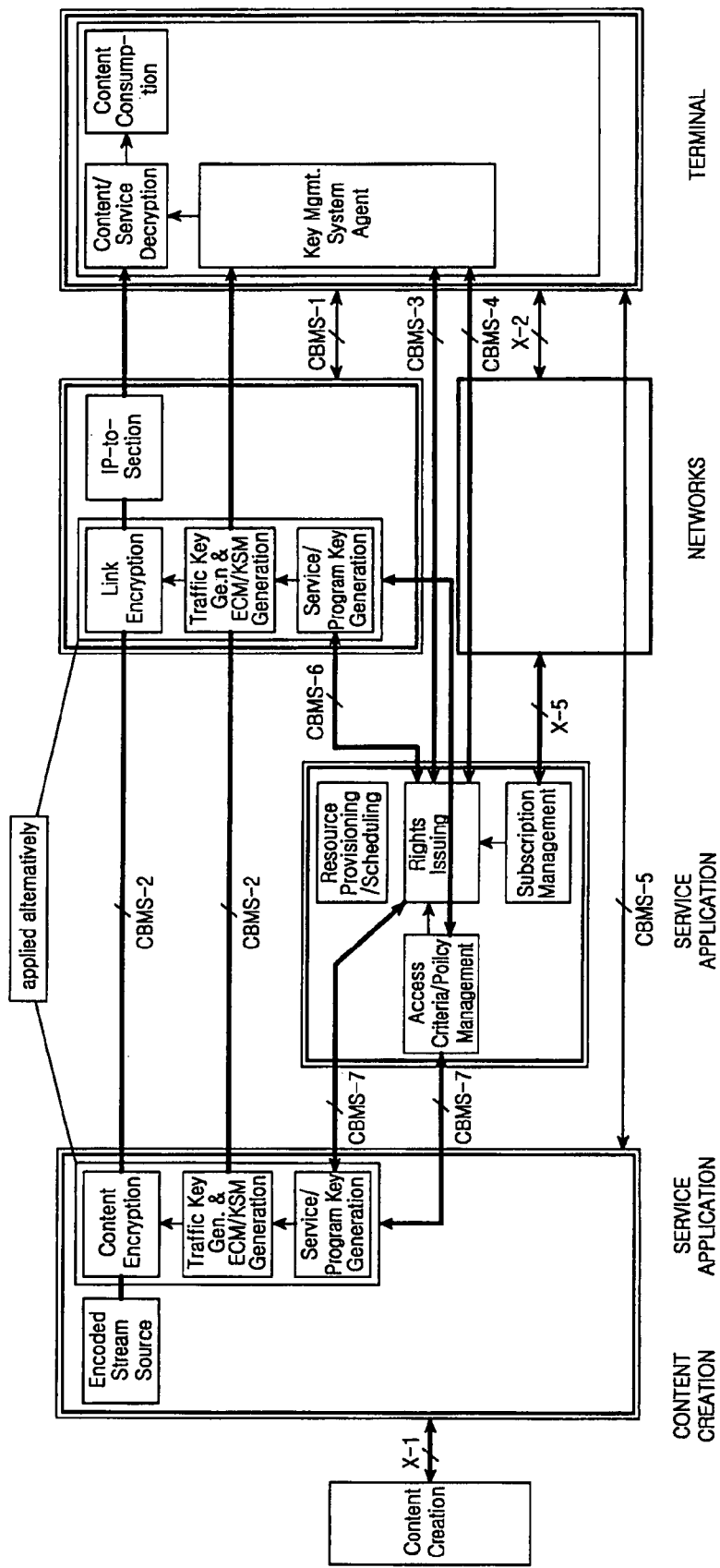
FIG. 13 illustrates a CBMS-based service purchase architecture in a mobile broadcast system according to the second embodiment of the present invention.

FIG. 13 illustrates a CBMS-based service purchase architecture corresponding to the OMA-based architecture of FIG. 3. A description of the entities in FIG. 13 is given in Table 19.

TABLE 19

| Logical sub-entity | Logical Entity it is part of | Involved Ref. Points | Description |
| --- | --- | --- | --- |
| Encoded stream source | Service Application | CBMS-2 | Entity outputting media streams (e.g. Audio, Video, Data) towards broadcast networks, using configuration parameters obtained from service application configuration sub-entity |
| Content Encryption | Service Application | CBMS-2 | Entity in charge of encrypting the content stream. Content encryption and link encryption need not to be used simultaneously. |
| Link Encryption | Broadcast Network | CBMS-2 | Entity in charge of encrypting the data stream at the link level. This type of encryption is agnostic of the service content. Content encryption and link encryption need not to be used simultaneously. |
| Traffic Key Generation and ECM/KSM Generation | Service Application or Broadcast Network | CBMS-2 | This entity generates the Traffic Encryption Keys for content or link traffic, respectively. TEKs are frequently changed. |
| Service/Program Key Generation | Service Application or Broadcast Network | CBMS-7 | This entity generates the keys for service/program access. It is controlled by the Service Management's Access Criteria/Policy Management sub-entity. Service/Program keys are exchanged with Rights Issuing sub-entity in Service Management. |
| IP-to-section | Broadcast Network | | See table 5. |
| Access Criteria/Policy Management | Service Management | CBMS-7, CBMS-6 | This entity may define services, programs, and their lifetimes, which bundles of media flows they contain and the access criteria to the content. May also define purchasable items, such as service bundles. |
| Rights Issuing | Service Management | CBMS-3, CBMS-4, CBMS-6, CBMS-7 | This entity furnishes rights messages for delivery to the terminal's Key Management System Agent. This process may requires access criteria, service/program keys, and the result of a successful purchase transaction. The latter is managed by the Subscription Management sub-entity. |

TABLE 19-continued

| Logical sub-entity | Logical Entity it is part of | Involved Ref. Points | Description |
|---|---|---|---|
| Subscription Management | Service Management | X-5(opt.) | This entity manages the specifics of each end user's subscription. It may use the interactive network's billing function over the X-5 reference point or other, independently operated billing systems. This billing function, however, is out of scope of this specification. |
| Resource Provisioning/Scheduling | Service Management | | See table 3. Used here for configuration of KSM delivery |
| Content/Service Decryption | Terminal | CBMS-2 | This entity decrypts content/link traffic with the TEKs the Key Management System Agent provides |
| Key Management System Agent | Terminal | CBMS-2, CBMS-3, CBMS-4 | This entity receives and manages Rights messages and Key Stream Messages. If all criteria for entitlement match, the TEK is reconstructed and provided to the Content/Service Decryption entity. |
| Content consumption | Terminal | CBMS-2 | Entity processing the received media stream; it may include facilities for buffering, synchronization, storing, and rendering of the stream content. |

Of the entities in FIG. 13 and Table 19, the entities necessary for the present invention include a 'Subscription Management' entity, a 'Rights issuing' entity, and a 'Key management system agent' entity in a Terminal.

Functions of the 'Subscription Management' entity and the 'Rights issuing' entity are mapped to the function of the BSP-M 301 in FIG. 3, and the 'Key management system agent' entity is mapped to the BSP-C 302 of FIG. 3.

Figure 14:
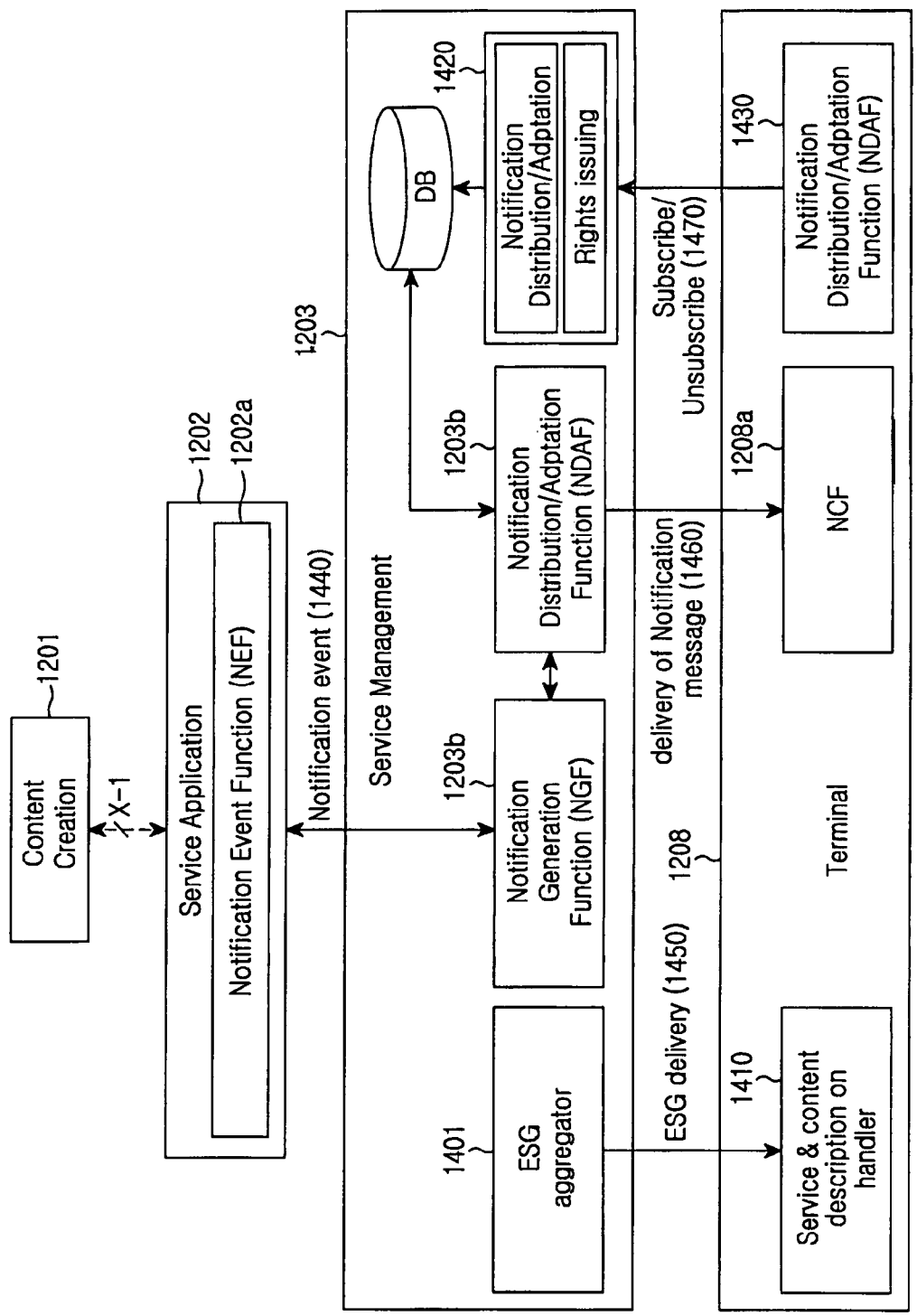
FIG. 14 illustrates signaling between network entities in a mobile broadcast system according to the second embodiment of the present invention.
Figure 15A:
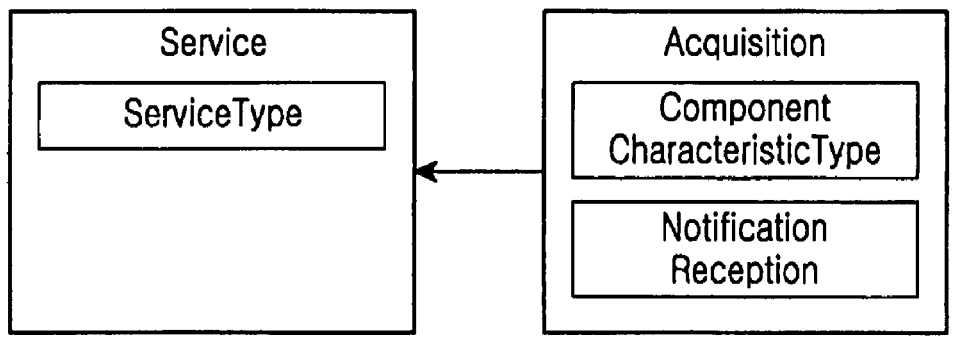
FIGS. 15A to 15D illustrate CBMS-based ESG data model fragments in a mobile broadcast system according to the second embodiment of the present invention.
Figure 15B:
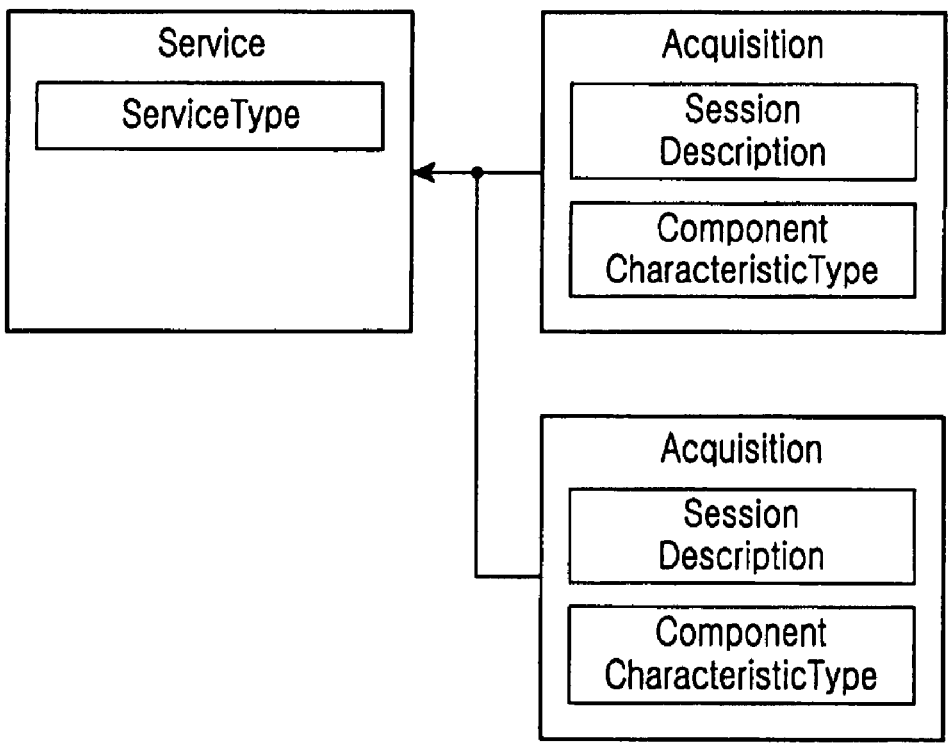
Figure 15C:
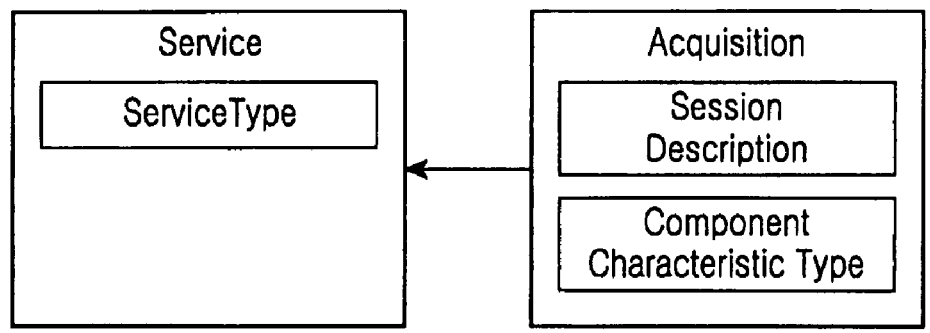
Figure 15D:
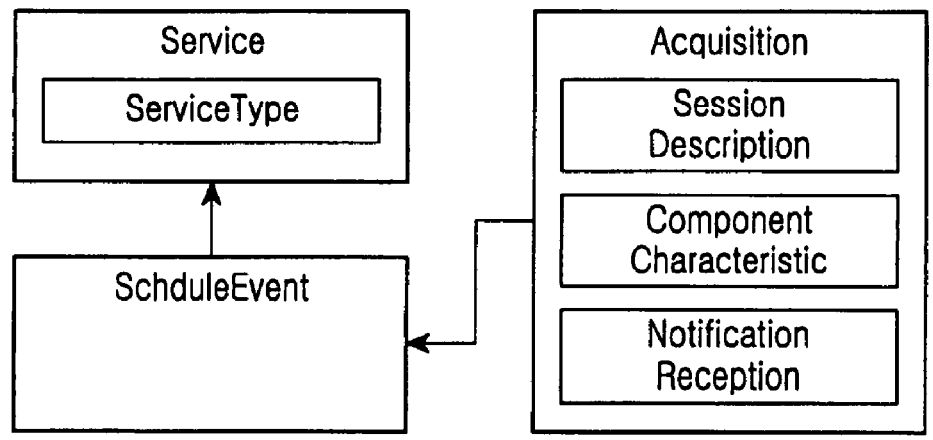

FIG. 14 illustrates an architecture corresponding to the OMA-based architecture of FIG. 4. Shown are signaling procedures corresponding to the signaling procedures 402, 403, 405 and 408 between the network entities described in FIG. 4. That is, reference numerals 1450, 1460, 1470 and 1440 correspond to reference numerals 402, 408, 403 and 405 of FIG. 4.

FIGS. 15A through 15D illustrates CBMS-based ESG data model fragments corresponding to those in FIGS. 5A through 5D. However, a fragment corresponding to the PurchaseItem fragment is omitted herein, because it is not related to the present invention. The 'Service' fragment and the 'Acquisition' fragment correspond to the 'Service' fragments and the 'Access' fragment of FIGS. 5A through 5D, respectively.

As to the elements and attributes in the fragments, 'ServiceType' corresponds to 'ServiceType', 'AccessType' corresponds to 'SessionDescription', 'ServiceClass' corresponds to 'ComponentCharacteristic', and 'NotificationReception' corresponds to 'NotificationReception'. That is, in FIGS. 15A through 15D, 'NotificationService' can be defined as a type of ServiceType in 'ServiceType'. As the access information for access to a notification message is contained in 'AccessType' of FIGS. 5A through 5D, the corresponding access information is expressed in 'SessionDescription'. Like the 'ServiceClass' indicating a notification message service class, NotificationComponentType, in addition to Video, audio and file, is defined using an element 'ComponentCharacteristicType', thereby indicating that a component type of the corresponding Acquisition fragment is a notification message.

Table 20A shows an exemplary XML schema for the newly defined NotificationComponentType, and it has an element NotificationType.

TABLE 20A

<xs:complexType name="NotificationComponentType">
  <xs:sequence>

TABLE 20A-continued

<xs:element name="NotificationType" type="xs:integer" minOccurs="0"/>
  </xs:sequence>
</xs:complexType>

A configuration shown in Table 20B is also possible. In Table 20B, NotificationType is defined as an element NotificationComponentType, and multiple NotificationTypes can be used. In addition, it is also possible to add other elements capable of defining the NotificationComponent. "esg: ComponentCharacteristicType" in Table 20B is a part indicating a characteristic of a basic component defined in the current DVB-CBMS ESG spec (ETSI TS 102 471), and this is used as it is used in the existing VideoComponentType or AudioComponentType.

TABLE 20B

<complexType name="NotificationComponentType">
<complexContent>
<extension base="esg: ComponentCharacterstic Type">
<sequence>
<element name="NotificationType" type="string" minOccurs="0" maxOccurs="unbounded"/>
</sequence>
</complexContent>
</complexType>

Table 21A shows an example of a notification message subscription request message suitable for a CBMS network according to the present invention, which is mapped to the message of Table 7. Table 21B includes an embodiment that enables the ServiceID-specific subscription in Table 15. In Table 21, the italic parts are added for the notification message subscription request.

TABLE 21A

<xs:element name="purchaseRequest" type="purchaseRequestType"/>
<xs:complexType name="purchaseRequestType">
 <xs:complexContent>
  <xs:extension base="requestType">
   <xs:sequence>
    <xs:element name="user" type="userDataType"/>
    <xs:element name="device" type="deviceDataType"/>
    <xs:element name="domain" minOccurs="0">
     <xs:complexType>
      <xs:sequence>

TABLE 21A-continued

```
        <xs:element name="domainID"/>
      </xs:sequence>
    </xs:complexType>
  </xs:element>
  <xs:element name="serviceOperatorCentre"
    type="serviceOperatorCentreDataType"/>
  <xs:element name="purchaseItemList">
    <xs:complexType>
      <xs:sequence>
        <xs:element name="purchaseItem" type="purchaseItemType"
maxOccurs="unbounded"/>
      </xs:sequence>
    </xs:complexType>
  </xs:element>
  <xs:element name="notification" type="xs:boolean"
    minOccurs="0"/>
    <xs:element name="signature" type="base64Binary"/>
  </xs:sequence>
 </xs:extension>
</xs:complexContent>
</xs:complexType>
```

TABLE 21B

```
<xs:element name="purchaseRequest" type="purchaseRequestType"/>
<xs:complexType name="purchaseRequestType">
  <xs:complexContent>
    <xs:extension base="requestType">
      <xs:sequence>
        <xs:element name="user" type="userDataType"/>
        <xs:element name="device" type="deviceDataType"/>
        <xs:element name="domain" minOccurs="0">
          <xs:complexType>
            <xs:sequence>
              <xs:element name="domainID"/>
            </xs:sequence>
          </xs:complexType>
        </xs:element>
        <xs:element name="serviceOperatorCentre"
          type="serviceOperatorCentreDataType"/>
        <xs:element name="purchaseItemList">
          <xs:complexType>
            <xs:sequence>
              <xs:element name="purchaseItem"
                type="purchaseItemType"
maxOccurs="unbounded"/>
            </xs:sequence>
          </xs:complexType>
        </xs:element>
        <xs:element name="ServiceID" type="anyURI"
          minOccurs="0"/>
          <xs:complexType>
            <xs:attxibute name="notification" type="xs:boolean"
              minOccurs="0"/>
          </xs:complexType>
        <xs:element name="signature" type="base64Binary"/>
      </xs:sequence>
    </xs:extension>
  </xs:complexContent>
</xs:complexType>
```

Table 22 shows an example of a notification message unsubscription request message, and the result obtained by mapping the unsubscription messages of Table 9, Table 16 and Table 17 to the CBMS network. Referring to Table 22B, a requested notification message can be individually unsubscribed for each individual ServiceID. When there is no need for ServiceID-specific unsubscription, it can be an embodiment for unsubscribing the entire Notification of Purchaseitem, as shown in Table 22A. In addition, when unsubscribing a general service, the user may not desire to unsubscribe a notification message related to the service. In this case, as shown in Table 22C, even while unsubscribing the main service with use of an attribute 'KeepSubscription', the user may not unsubscribe the notification message provided in association with the main service.

TABLE 22A

```
<xs:element name="cancellationRequest"
  type="cancellationRequestType"/>
<xs:complexType name="cancellationRequestType">
  <xs:complexContent>
    <xs:extension base="requestType">
      <xs:sequence>
        <xs:element name="user" type="userDataType"/>
        <xs:element name="device" type="deviceDataType"/>
        <xs:element name="serviceOperatorCentre"
          type="serviceOperatorCentreType"/>
        <xs:element name="purchaseItemList">
          <xs:complexType>
            <xs:sequence>
              <xs:element name="purchaseItemList"
type="purchaseItemListType"maxOccurs="unbounded"/>
            </xs:sequence>
          </xs:complexType>
        </xs:element>
        <xs:element name="notification" type="xs:boolean"
          minOccurs="0"/>
        <xs:element name="signature" type="base64Binary"/>
      </xs:sequence>
    </xs:extension>
  </xs:complexContent>
</xs:complexType>
```

TABLE 22B

```
<xs:element name="cancellationRequest"
type="cancellationRequestType"/>
<xs:complexType name="cancellationRequestType">
 <xs:complexContent>
  <xs:extension base="requestType">
    <xs:sequence>
     <xs:element name="user" type="userDataType"/>
     <xs:element name="device" type="deviceDataType"/>
     <xs:element name="serviceOperatorCentre"
       type="serviceOperatorCentreType"/>
     <xs:element name="purchaseItemList">
       <xs:complexType>
         <xs:sequence>
          <xs:element
            name="purchaseItemList"
            type="purchaseItemListType"maxOccurs="unbounded"/>
         </xs:sequence>
       </xs:complexType>
     </xs:element>
     <xs:element name="ServiceID"
       type="anyURI" minOccurs="0"/>
       <xs:complexType>
         <xs:attribute name="notification" type="xs:boolean"
           minOccurs="0"/>
       </xs:complexType>
     <xs:element name="signature" type="base64Binary"/>
    </xs:sequence>
  </xs:extension>
 </xs:complexContent>
</xs:complexType>
```

TABLE 22C

```
<xs:element name="cancellationRequest"
type="cancellationRequestType"/>
<xs:complexType name="cancellationRequestType">
  <xs:complexContent>
    <xs:extension base="requestType">
      <xs:sequence>
        <xs:element name="user" type="userDataType"/>
        <xs:element name="device" type="deviceDataType"/>
        <xs:element name="serviceOperatorCentre"
          type="serviceOperatorCentreType"/>
        <xs:element name="purchaseItemList">
```

TABLE 22C-continued

```
    <xs:complexType>
        <xs:sequence>
            <xs:element name="purchaseItem"
                type="purchaseItemType"maxOccurs="unbounded"/>
        </xs:sequence>
    </xs:complexType>
    </xs:element>
    <xs:attribute name="keepsubscription"
        type="xs:boolean" minOccurs="0"/>
    <xs:element name="signature" type="base64Binary"/>
    </xs:sequence>
  </xs:extension>
</xs:complexContent>
</xs:complexType>
```

FIGS. 7 and 8 are used even in the CBMS-based embodiment, so a detailed description thereof will be omitted.

FIG. 16 illustrates a CBMS-based ESG data module mapped to the OMA-based ESG data model of FIG. 9, and illustrates elements of the ESG data model described in FIG. 15. Referring to FIG. 16, it is noted that 'NotificationComponentType' 1603 is newly defined to indicate an Acquisition fragment for a notification message in Component Characteristic.

As can be understood from the foregoing description, the present invention defines a notification message in an interaction channel, making it possible to deliver the notification message not only in the broadcast channel but also in the interaction channel. In addition, the present invention provides a method for checking, from a service guide, for the presence of a service or a notification message an auxiliary means of the service. In this manner, subscription and unsubscription for the corresponding notification message is possible.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for providing a notification message in a transmitter of a mobile broadcast system supporting an interaction channel, the method comprising the steps of:
(a) upon an occurrence of a notification event, generating, by an entity that manages subscription information of a terminal, the notification message to inform at least one terminal of the notification event, and generating at least one delivery request message including a target address based on the subscription information of the terminal, for requesting a delivery of the generated notification message; and
(b) determining, by an entity that delivers the notification message, whether to use a broadcast channel or the interaction channel as the delivery channel over which the entity that delivers the notification message will deliver the notification message to the terminal by parsing the target address in the received delivery request message, and delivering the notification message over the determined channel to the terminal,
wherein the target address includes delivery channel information indicating either a broadcast channel or the interaction channel as the delivery channel for delivery of the generated notification message.

2. The method of claim 1, wherein step (b) comprises:
checking an address type of the terminal based on the target address if the notification message is delivered using the interaction channel; and
delivering the notification message to the terminal through the interaction channel according to the address type.

3. The method of claim 1, wherein step (b) comprises:
checking a target session address for the broadcast channel based on the target address if the notification message is delivered using the broadcast channel; and
delivering the notification message to the terminal through the broadcast channel according to the target session address.

4. The method of claim 1, further comprising:
receiving from the terminal, by the entity that manages the subscription information, a message for requesting subscription or purchase of the notification message; and
handling the subscription or purchase request message and storing the subscriber information of the terminal.

5. The method of claim 1, further comprising:
receiving from the terminal, by the entity that manages the subscription information, a message for requesting subscription or purchase of a service-specific notification message; and
handling the subscription or purchase request message and storing the corresponding service and the subscriber information of the terminal.

6. The method of claim 1, further comprising:
receiving from the terminal, by the entity that manages the subscription information, a message for requesting unsubscription of the notification message for all services;
unsubscribing the notification message delivery for all services for the terminal.

7. The method of claim 1, further comprising;
receiving from the terminal, by the entity that manages the subscription information, a message for requesting unsubscription of a service-specific notification message; and
unsubscribing delivery of the notification message for the unsubscription-requested service.

8. The method of claim 1, wherein the target address includes an address type based on the delivery channel, for each terminal.

9. A transmitter in a mobile broadcast system supporting an interaction channel, the transmitter comprising:
an entity for managing subscription information of a terminal, and upon an occurrence of a notification event, generating a notification message to inform at least one terminal of the notification event and generating at least one delivery request message including a target address based on the subscription information of the terminal, for requesting a delivery of the generated notification message; and
an entity for determining whether to use a broadcast channel or the interaction channel as the delivery channel over which it will deliver the notification message to the terminal by parsing the target address in the received delivery request message, and delivering the notification message over the determined channel to the terminal,
wherein the target address includes delivery channel information indicating either a broadcast channel or the interaction channel as the delivery channel for delivery of the notification message.

10. The transmitter of claim 9, wherein the entity for determining a channel:

checks an address type of the terminal based on the target address if the notification message is delivered using the interaction channel; and delivers the notification message to the terminal through the interaction channel according to the address type.

11. The transmitter of claim 9, wherein the entity for determining a channel:

check a target session address for the broadcast channel based on the target address if the notification message is delivered using the broadcast channel; and delivers the notification message to the terminal through the broadcast channel according to the target session address.

12. The transmitter of claim 9, wherein the entity for managing subscription information:

receives from the terminal a message for requesting subscription or purchase of the notification message; and handles the subscription or purchase request message and stores the subscriber information of the terminal.

13. The transmitter of claim 9, wherein the entity for managing subscription information:

receives from the terminal a subscription or purchase request message for a service-specific notification message; and handles the subscription or purchase request message and stores the corresponding service and the subscriber information of the terminal.

14. The transmitter of claim 9, wherein the entity for managing subscription information:

upon receipt from the terminal of a message for requesting unsubscription of the notification message for all services, unsubscribes the notification message delivery for all services for the terminal.

15. The transmitter of claim 9, wherein the entity for managing subscription information;

upon receipt from the terminal of a message for requesting unsubscription of a service-specific notification message, unsubscribes delivery of the notification message for the unsubscription-requested service.

16. The transmitter of claim 9, wherein the target address includes an address type based on the delivery channel, for each terminal.

17. The transmitter of claim 9, wherein the entity for managing the subscription information is a Notification Generation function (NTG) and the entity for determining the channel and delivering the notification message is a Notification Distribution/Adaptation Function (NTDA).

* * * * *